(12) United States Patent
Itadani et al.

(10) Patent No.: US 7,667,793 B2
(45) Date of Patent: Feb. 23, 2010

(54) LIQUID CRYSTAL DISPLAY DEVICE

(75) Inventors: Motohiro Itadani, Ota-ku (JP); Shuhei Okude, Yokohama (JP); Shunsuke Yamanaka, Takaoka (JP); Kohei Arakawa, Machida (JP)

(73) Assignee: Zeon Corporation, Tokyo (JP)

( * ) Notice: Subject to any disclaimer, the term of this patent is extended or adjusted under 35 U.S.C. 154(b) by 218 days.

(21) Appl. No.: 10/579,739

(22) PCT Filed: Nov. 18, 2004

(86) PCT No.: PCT/JP2004/017538

§ 371 (c)(1),
(2), (4) Date: May 18, 2006

(87) PCT Pub. No.: WO2005/050299

PCT Pub. Date: Jun. 2, 2005

(65) Prior Publication Data

US 2007/0091228 A1    Apr. 26, 2007

(30) Foreign Application Priority Data

Nov. 21, 2003 (JP) ............................. 2003-392976
Jan. 30, 2004 (JP) ............................. 2004-024638
Sep. 27, 2004 (JP) ............................. 2004-279373

(51) Int. Cl.
*G02F 1/1335* (2006.01)

(52) U.S. Cl. ........................... 349/96; 349/99; 349/102; 349/117; 349/119

(58) Field of Classification Search ............... 349/96, 349/98–99, 102, 103, 117, 119, 140, 141
See application file for complete search history.

(56) References Cited

U.S. PATENT DOCUMENTS

| 2,367,661 A | 1/1945 | Agre |
| 2,367,670 A | 1/1945 | Christ |
| 2,448,828 A | 9/1948 | Renfrew |
| 2,722,512 A | 11/1955 | Crandall |
| 2,951,758 A | 9/1960 | Notley |

(Continued)

FOREIGN PATENT DOCUMENTS

JP     S60-105667     6/1985

(Continued)

*Primary Examiner*—Frank G Font
*Assistant Examiner*—Michael P Mooney
(74) *Attorney, Agent, or Firm*—Birch, Stewart, Kolasch & Birch, LLP

(57) ABSTRACT

A liquid crystal display device of an in-plane switching mode comprises at least optically anisotropic members (A) and (B) and liquid crystal cell disposed between a pair of polarizers having absorption axes disposed approximately perpendicularly to each other, wherein $n_{zA} > n_{yA}$ and $n_{xB} > n_{zB}$ ($n_{xA}$, $n_{xB}$: refractive indices (n) in the direction of the in-plane slow axis; $n_{yA}$, $n_{yB}$: n in the in-plane direction perpendicular to the above direction; $n_{zA}$, $n_{zB}$: n in the direction of thickness, each at 550 nm); the in-plane slow axes of (A) and (B) are approximately parallel or perpendicular to each other; and the in-plane slow axis of (A) is approximately parallel or perpendicular to the absorption axis of a polarizer closer to (A). The antireflection property, scratch resistance and durability are excellent, the angle of field is wide, and uniform display of images with great contrast can be achieved at any angle of observation.

6 Claims, 8 Drawing Sheets

U.S. PATENT DOCUMENTS

| | | | |
|---|---|---|---|
| 3,046,127 | A | 7/1962 | Barney |
| 3,549,367 | A | 12/1970 | Chang |
| 4,212,970 | A | 7/1980 | Iwasaki et al. |
| 4,239,850 | A | 12/1980 | Kita et al. |
| 4,402,927 | A | 9/1983 | von Dardel et al. |
| 4,432,956 | A | 2/1984 | Zarzycki et al. |
| 4,610,863 | A | 9/1986 | Tewari et al. |
| 4,619,998 | A | 10/1986 | Buhr |
| 4,696,888 | A | 9/1987 | Buhr |
| 5,124,364 | A | 6/1992 | Wolff et al. |
| 5,137,279 | A | 8/1992 | Murphy et al. |
| 5,138,474 | A | 8/1992 | Arakawa et al. |
| 5,189,538 | A | 2/1993 | Arakawa et al. |
| 6,115,095 | A | 9/2000 | Suzuki et al. |
| 6,184,957 | B1 | 2/2001 | Mori et al. |
| 6,961,180 | B2 | 11/2005 | Umemoto et al. |
| 2002/0196901 | A1 | 12/2002 | Inoue |
| 2003/0122991 | A1* | 7/2003 | Itakura et al. ................. 349/43 |
| 2004/0101106 | A1 | 5/2004 | Inoue |

FOREIGN PATENT DOCUMENTS

| | | |
|---|---|---|
| JP | 02-256023 A | 10/1990 |
| JP | 03-206422 A | 9/1991 |
| JP | 04-305602 A | 10/1992 |
| JP | 7-261152 A | 10/1995 |
| JP | 9-80424 A | 3/1997 |
| JP | 10-54982 A | 2/1998 |
| JP | 10-307291 A | 11/1998 |
| JP | H10-333145 | 12/1998 |
| JP | 11-133408 A | 5/1999 |
| JP | 11-305217 A | 11/1999 |
| JP | 2000-227520 A | 8/2000 |
| JP | 2001-233611 A | 8/2001 |
| JP | 2001-242462 A | 9/2001 |
| JP | 2002-148433 A | 5/2002 |
| JP | 2002-321302 A | 11/2002 |
| JP | 2003-149642 A | 5/2003 |
| JP | 2003-195310 A | 7/2003 |

* cited by examiner

BACKLIGHT SIDE

VISION SIDE

LIQUID CRYSTAL DISPLAY DEVICE

TECHNICAL FIELD

The present invention relates to a liquid crystal display device. More particularly, the present invention relates to a liquid crystal display device which exhibits excellent antireflection property, scratch resistance and durability, provides a wide angle of field and achieves uniform display of images with great contrast at any angle of observation.

BACKGROUND ART

Liquid crystal display devices are characterized by the high quality of images, the small thickness, the light weight and the small consumption of electric power and widely used for televisions, personal computers and automobile navigators. It has been pointed out that liquid crystal display devices have a drawback in that brightness, color and contrast vary to a great extent and difficulty arises in watching images when the images are observed at oblique angles.

To overcome the drawback, improvements in the design of the liquid crystal cell itself have been studied, and a liquid crystal display device of the in-plane switching mode is proposed as one of the improvements (for example, Patent Reference 1). In accordance with the proposed technology, the angle of field is improved in comparison with that of liquid crystal display devices of other modes. However, in accordance with this technology, the arrangement of polarizer plates shifts from the cross-nichol arrangement depending on the angle of observation, and this causes a decrease in the angle of field due to leak of light although the decrease in the angle of field due to the liquid crystal molecules in the liquid crystal cell is relatively suppressed. Moreover, further improvement is desired with respect to the narrow angle of field due to the liquid crystal molecules in the liquid crystal cell. Therefore, it is attempted that the decrease in the contrast of images is suppressed by adding a means for optical compensation to the liquid crystal display devices of the in-plane switching mode.

For example, a liquid crystal display device in which a sheet for optical compensation is disposed between a liquid crystal cell and at least one of polarizer plates, the sheet for optical compensation is optically negatively uniaxial, and the optical axis is parallel to the face of the sheet, is proposed (Patent Reference 2).

As another liquid crystal display device of the in-plane switching mode, a liquid crystal display device in which a first polarizer plate, a film for optical compensation, a first substrate, a liquid crystal layer, a second substrate and a second polarizer plate are disposed in this order, one of the polarizer plates has a transmission axis parallel to the slow axis of the liquid crystal during the dark display of the liquid crystal layer, and the angle between the slow axis of the film in the sheet for optical compensation and the transmission axis in one of the polarizer plates is 0 to 2° or 88 to 90°, is proposed (Patent Reference 3).

However, none of these means are sufficient for providing a liquid crystal display device which exhibits uniform display of images with a great contrast at any angle of observation, and further improvement has been desired.

[Patent Reference 1] Japanese Patent Application Laid-Open No. Heisei 7(1995)-261152

[Patent Reference 2] Japanese Patent Application Laid-Open No. Heisei 10(1998)-054982

[Patent Reference 3] Japanese Patent Application Laid-Open No. Heisei 11(1999)-305217

DISCLOSURE OF THE INVENTION

The present invention has an object of providing a liquid crystal display device which exhibits excellent antireflection property, scratch resistance and durability, provides a wide angle of field and achieves uniform display of images with great contrast at any angle of observation.

As the result of intensive studies by the present inventors to overcome the above problems, it was found that the decrease in the contrast could be prevented and a liquid crystal display device of the in-plane switching mode exhibiting a wide angle of field with a great contrast could be obtained when two layers of optically anisotropic members having a specific refractive index were disposed at specific relative positions with respect to a liquid crystal cell and a polarizer, and that the decrease in the contrast could be prevented and a liquid crystal display device of the in-plane switching mode exhibiting a wide angle of field with a great contrast could be obtained when optically anisotropic member (A) satisfying $n_z > n_y$ and optically anisotropic member (B) satisfying $n_x > n_z$ were arranged at specific relative positions with respect to the liquid crystal cell and a polarizer, wherein $n_x$ represented the refractive index in the direction of the in-plane slow axis, $n_y$ represented the refractive index in the direction in-plane and perpendicular to the in-plane slow axis, and $n_z$ represented the refractive index in the direction of the thickness, each measured using light having a wavelength of 550 nm. The present invention has been completed based on the knowledge.

The present invention provides:

(1) A liquid crystal display device of an in-plane switching mode which comprises a pair of polarizers which are a polarizer at an output side and a polarizer at an incident side and disposed at relative positions such that absorption axes of the polarizers are approximately perpendicular to each other and at least optically anisotropic member (A), optically anisotropic member (B) and a liquid crystal cell which are disposed between the pair of polarizers, wherein $n_{zA} > n_{yA}$ and $n_{xB} > n_{zB}$ when, with respect to optically anisotropic member (A) and optically anisotropic member (B), refractive indices in a direction of an in-plane slow axis are represented by $n_{xA}$ and $n_{xB}$, respectively, refractive indices in a direction in-plane and perpendicular to the direction of an in-plane slow axis are represented by $n_{yA}$ and $n_{yB}$, respectively, and refractive indices in a direction of a thickness are represented by $n_{zA}$ and $n_{zB}$, respectively, each measured using light having a wavelength of 550 nm; the in-plane slow axis of optically anisotropic member (A) and the in-plane slow axis of optically anisotropic member (B) are disposed at relative positions approximately parallel or approximately perpendicular to each other; and the in-plane slow axis of optically anisotropic member (A) and the absorption axis of a polarizer disposed closer to optically anisotropic member (A) are disposed at relative positions approximately parallel or approximately perpendicular to each other;

(2) The liquid crystal display device described in (1), wherein the absorption axis of the polarizer at the output side and the in-plane slow axis of a liquid crystal of the liquid crystal cell under application of no voltage are disposed at relative positions parallel to each other, optically anisotropic member (A) and optically anisotropic member (B) are disposed between the liquid crystal cell and the polarizer at the incident side, and the in-plane slow axes of optically anisotropic member (A) and optically anisotropic member (B) are disposed at relative positions approximately parallel to each other;

(3) The liquid crystal display device described in (2), wherein the in-plane slow axis of optically anisotropic member (B) and the in-plane slow axis of the liquid crystal of the liquid crystal cell under application of no voltage are disposed at relative positions approximately parallel to each other, and optically anisotropic member (A) is disposed at a position closer to the liquid crystal cell than optically anisotropic member (B);

(4) The liquid crystal display device described in (2), wherein the in-plane slow axis of optically anisotropic member (B) and the in-plane slow axis of the liquid crystal of the liquid crystal cell under application of no voltage are disposed at relative positions approximately perpendicular to each other, and optically anisotropic member (B) is disposed at a position closer to the liquid crystal cell than optically anisotropic member (A);

(5) The liquid crystal display device described in (1), wherein the absorption axis of the polarizer at the output side and the in-plane slow axis of a liquid crystal of the liquid crystal cell under application of no voltage are disposed at relative positions parallel to each other, optically anisotropic member (A) and optically anisotropic member (B) are disposed between the liquid crystal cell and the polarizer at the output side, and the in-plane slow axes of optically anisotropic member (A) and optically anisotropic member (B) are disposed at relative positions approximately parallel to each other;

(6) The liquid crystal display device described in (5), wherein the in-plane slow axis of optically anisotropic member (B) and the in-plane slow axis of the liquid crystal of the liquid crystal cell under application of no voltage are disposed at relative positions approximately perpendicular to each other, and optically anisotropic member (A) is disposed at a position closer to the liquid crystal cell than optically anisotropic member (B);

(7) The liquid crystal display device described in (5), wherein the in-plane slow axis of optically anisotropic member (B) and the in-plane slow axis of the liquid crystal of the liquid crystal cell under application of no voltage are disposed at relative positions approximately parallel to each other, and optically anisotropic member (B) is disposed at a position closer to the liquid crystal cell than optically anisotropic member (A);

(8) The liquid crystal display device described in (1), wherein the absorption axis of the polarizer at the output side and the in-plane slow axis of a liquid crystal of the liquid crystal cell under application of no voltage are disposed at relative positions parallel to each other, optically anisotropic member (A) and optically anisotropic member (B) are disposed separately between the liquid crystal cell and the polarizer at the incident side and between the liquid crystal cell and the polarizer at the output side, and the in-plane slow axes of optically anisotropic member (A) and optically anisotropic member (B) are disposed at relative positions approximately parallel to each other;

(9) The liquid crystal display device described in (8), wherein the in-plane slow axis of optically anisotropic member (A) and the in-plane slow axis of the liquid crystal of the liquid crystal cell under application of no voltage are disposed at relative positions approximately perpendicular, to each other, and optically anisotropic member (A) is disposed between the liquid crystal cell and the polarizer at the incident side;

(10) The liquid crystal display device described in (8), wherein the in-plane slow axis of optically anisotropic member (A) and the in-plane slow axis of the liquid crystal of the liquid crystal cell under application of no voltage are disposed at relative positions approximately parallel to each other, and optically anisotropic member (A) is disposed between the liquid crystal cell and the polarizer at the output side;

(11) The liquid crystal display device described in any one of (1) to (10), wherein an absolute value of a difference between $n_{xA}$ and $n_{zA}$ is 0.003 or smaller, and an absolute value of a difference between $n_{yB}$ and $n_{zB}$ is 0.003 or smaller; and

(12) The liquid crystal display device described in any one of (1) to (ii), wherein optically anisotropic member (A) comprises a layer selected from following layers (i) to (iii):
(i) A layer comprising a material having a negative value of intrinsic birefringence,
(ii) A layer comprising discotic liquid crystal molecules or lyotropic liquid crystal molecules,
(iii) A layer comprising a photo-isomerizable substance.

(13) A liquid crystal display device which comprises a pair of polarizers disposed at relative positions such that transmission axes of the polarizers are approximately perpendicular to each other and at least optically anisotropic member (A), optically anisotropic member (B) and a liquid crystal cell which are disposed between the pair of polarizers, wherein optically anisotropic member (A) comprises a material layer having a negative value of intrinsic birefringence, optically anisotropic member (B) comprises a material layer having a positive value of intrinsic birefringence, the in-plane slow axis of optically anisotropic member (A) and the in-plane slow axis of optically anisotropic member (B) are disposed at relative positions approximately parallel or perpendicular to each other, and the in-plane slow axis of optically anisotropic member (A) and a transmission axis of a polarizer disposed closer to optically anisotropic member (A) are disposed at relative positions approximately parallel or approximately perpendicular to each other; and

(14) A liquid crystal display device which comprises a pair of polarizers disposed at relative positions such that transmission axes of the polarizers are approximately perpendicular to each other and at least optically anisotropic member (A), optically anisotropic member (B) and a liquid crystal cell which are disposed between the pair of polarizers, wherein optically anisotropic member (A) is a member obtained by fixing a liquid crystal compound to a transparent polymer film in a manner such that the liquid crystal compound is oriented in a perpendicular direction, optically anisotropic member (B) is a member obtained by orienting a film comprising a resin having a positive value of intrinsic birefringence, the in-plane slow axis of optically anisotropic member (A) and the in-plane slow axis of optically anisotropic member (B) are disposed at relative positions approximately parallel or perpendicular to each other, and the in-plane slow axis of optically anisotropic member (A) and a transmission axis of a polarizer disposed closer to optically anisotropic member (A) are disposed at relative positions approximately parallel or approximately perpendicular to each other;

To summarize the advantages of the present invention, the liquid crystal display device of the present invention exhibits excellent antireflection property, scratch resistance and durability, provides a wide angle of field and achieves uniform display of images with great contrast at any angle of observation. Therefore, the device can be advantageously used as a flat panel display having a great area.

In the present invention, the contrast (CR) means contrast expressed by $(CR)=Y_{ON}/Y_{OFF}$, wherein $Y_{OFF}$ represents the luminance during the dark display of a liquid crystal display device, and $Y_{ON}$ represents the luminance during the bright display of the liquid crystal display device. The greater the value of CR is, the better the visibility is. The bright display means the condition where the brightness of the liquid crystal display is the greatest. The dark display means the condition where the brightness of the liquid crystal display is the smallest. In the present invention, the polar angle means the angle between the direction of the observation and the direction directly in front of the display when the face of the liquid crystal display is observed.

Figure 1:
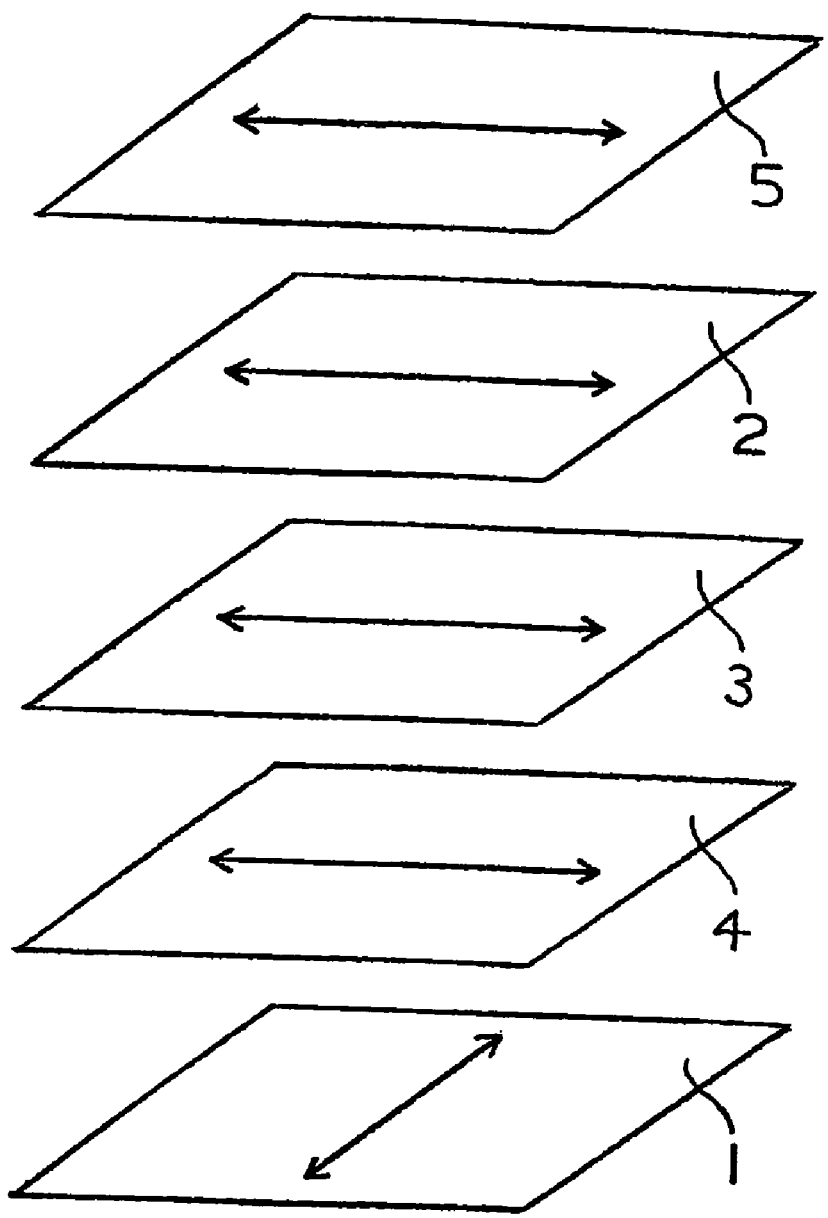
FIG. 1 shows a diagram exhibiting a preferable arrangement in the liquid crystal display device of the present invention.

The numbers in the Figures have the following meanings:
1: A polarizer of the incident side
2: A liquid crystal cell
3: Optically anisotropic member (A)
4: Optically anisotropic member (B)
5: A polarizer at the output side

THE MOST PREFERRED EMBODIMENT TO CARRY OUT THE INVENTION

In the liquid crystal display device of the present invention, it is preferable that $n_{zA} > n_{yA}$ when, with respect to optically anisotropic member (A), the refractive index in the direction of an in-plane slow axis is represented by $n_{xA}$, the refractive index in the direction in-plane and perpendicular to the direction of the in-plane slow axis is represented by $n_{yA}$, and the refractive index in the direction of the thickness is represented by $n_{zA}$, each measured using light having a wavelength of 550 nm. It is more preferable that $n_{zA} - n_{yA}$ is 0.00001 or greater. It is still more preferable that $n_{zA} - n_{yA}$ is 0.00003 or greater. When $n_{zA} \leq n_{yA}$, there is the possibility that the contrast of the liquid crystal display device is decreased from that obtained when the optically anisotropic member is not disposed.

In the present invention, the absolute value of the difference between $n_{xA}$ and $n_{zA}$ is 0.003 or smaller, preferably 0.002 or smaller, more preferably 0.001 or smaller, still more preferably 0.0008 or smaller, still more preferably 0.0005 or smaller, still more preferably 0.0003 or smaller and most preferably 0.0001 or smaller. When the refractive indices do not satisfy the above relation, there is the possibility that the contrast of the liquid crystal display device is decreased from that obtained when the optically anisotropic member is not disposed.

It is preferable that optically anisotropic member (A) used in the present invention comprises substances selected from (i) a layer comprising a material having a negative value of intrinsic birefringence, (ii) a layer comprising discotic liquid crystal molecules or lyotropic liquid crystal molecules, and (iii) a layer comprising a photo-isomerizable substance.

(i) A Layer Comprising a Material Having a Negative Value of Intrinsic Birefringence The material having a negative value of intrinsic birefringence means a material exhibiting a property such that, when light is incident on a layer having molecules oriented in the uniaxial order, the refractive index with respect to light in the direction of the orientation is smaller than the refractive index with respect to light in the direction perpendicular to the direction of the orientation.

Examples of the material having a negative value of intrinsic birefringence include vinyl aromatic polymers, polyacrylonitrile-based polymers, polymethyl methacrylate-based polymers, cellulose ester-based polymers and multi-component copolymers derived from these polymers. The material having a negative value of intrinsic birefringence may be used singly or in combination of two or more. Among these materials, vinyl aromatic polymers, polyacrylonitrile-based polymers and polymethyl methacrylate-based polymers are preferable, and vinyl aromatic polymers are more preferable since the birefringence is exhibited to a great degree.

Examples of the vinyl aromatic polymer include polystyrene and copolymers of vinyl aromatic monomers such as styrene, α-methylstyrene, o-methylstyrene, p-methylstyrene, p-chlorostyrene, p-nitrostyrene, p-aminostyrene, p-carboxystyrene and p-phenylstyrene with other monomers such as ethylene, propylene, butadiene, isoprene, (meth)acrylonitrile, α-chloroacrylonitrile, methyl (meth)acrylate, ethyl (meth)acrylate, (meth)acrylic acid, maleic anhydride and vinyl acetate. Among these polymers, polystyrene and copolymers of styrene and maleic anhydride are preferable.

In the present invention, where necessary, conventional additives such as antioxidants, heat stabilizers, light stabilizers, ultraviolet light absorbents, antistatic agents, dispersants, chlorine scavengers, flame retardants, nucleating agents for crystallization, antiblocking agents, anticlouding agents, mold releases, pigments, organic and inorganic fillers, neutralizing agents, lubricants, decomposing agents, metal inactivators, antifouling agents, antibacterial agents, other resins and thermoplastic elastomers may be added to the material having a negative value of the intrinsic birefringence as long as the effects of the present invention are not adversely affected.

The layer comprising the material having a negative value of the intrinsic birefringence may further comprise other materials. However, a layer comprising the material having a negative value of the intrinsic birefringence alone is preferable. A laminate having a layer comprising other materials laminated to at least one face of the layer comprising the material having a negative value of the intrinsic birefringence is preferable. A laminate having layers comprising other materials laminated to both faces of the layer comprising the material having a negative value of the intrinsic birefringence is more preferable.

The processes for producing the layer comprising the material having a negative value of the intrinsic birefringence and the laminate having a layer comprising other materials laminated to at least one face of the layer comprising the material having a negative value of the intrinsic birefringence are not particularly limited. Examples of the process include conventional processes such as the flow coating process using a solution, the injection molding process and the melt extrusion process.

It is preferable that the layer comprising the material having a negative value of intrinsic birefringence is an oriented layer comprising the material having a negative value of intrinsic birefringence. From the standpoint of exhibiting excellent workability, efficiently and easily forming optically anisotropic member (A) and maintaining stable and uniform phase difference for a long time, it is preferable that the laminate having a layer comprising other materials laminated to at least one face of the layer comprising the material having a negative value of the intrinsic birefringence is an oriented layer. It is more preferable that the laminate having a layer comprising other materials laminated to both faces of the layer comprising the material having a negative value of the intrinsic birefringence is an oriented layer. From the standpoint of efficiently utilizing the phase difference in the layer comprising the material having a negative value of intrinsic birefringence, it is preferable that the layer comprising other materials is a layer having substantially no orientation.

The processes for producing the oriented layer of the layer comprising the material having a negative value of intrinsic birefringence and the oriented layer of the laminate having a layer comprising other materials laminated to at least one face of the layer comprising the material having a negative value of the intrinsic birefringence are not particularly limited. From the standpoint of uniformly and efficiently controlling the refractive index of the optically anisotropic member in the direction of thickness, the process of stretching the layer comprising the material having a negative value of intrinsic birefringence is preferable.

From the standpoint of controlling the in-plane refractive index of the optically anisotropic member, the process of further laminating another stretched film to the stretched layer comprising the material having a negative value of intrinsic birefringence is also preferable.

It is preferable that the layer comprising the material having a negative value of intrinsic birefringence has a structure such that layers comprising other materials are laminated to both faces of the layer comprising the material having a negative value of intrinsic birefringence via a layer of an adhesive resin. Due to this structure, even when the layer comprising the material having a negative value of intrinsic birefringence has a small strength and stretching of the layer alone is difficult, the stretching becomes possible at a temperature where the birefringence is easily exhibited, and optically anisotropic member (A) having a uniform phase difference over the entire face of the layer can be obtained with excellent productivity without fracture.

The processes for stretching the oriented layer of the layer comprising the material having a negative value of intrinsic birefringence and the oriented layer of the laminate having a layer comprising other materials laminated to both faces of the layer comprising the material having a negative value of the intrinsic birefringence are not particularly limited, and a conventional process can be applied. Examples of the process include uniaxial stretching processes such as the process of uniaxial stretching in the longitudinal direction utilizing the difference in the circumferential speed of rolls, and the process of uniaxial stretching in the transverse direction using a tenter; processes of biaxial stretching such as the process of simultaneous stretching comprising longitudinal stretching by increasing the distance between fixing clips and transverse stretching by an increase in the angle of opening of guide rails, and the process of successive stretching comprising longitudinal stretching utilizing the difference in the circumferential speed of rolls, followed by transverse stretching using a tenter by gripping both end portions by clips; and processes of oblique stretching such as the process using a tenter stretcher which can apply longitudinal or transverse feeding force, tensile force or winding force at different rightward and leftward speeds, or a tenter stretcher which has the same distance of movement with a fixed angle of stretching θ or has different distances of movement while longitudinal or transverse feeding force, tensile force or winding force can be applied at the same rightward and leftward speeds.

As described above, by stretching the layer comprising the material having a negative value of intrinsic birefringence or by stretching the laminate having a layer comprising other materials laminated to at least one face of the layer comprising the material having a negative value of intrinsic birefringence, the refractive index in the direction perpendicular to the direction of stretching of the layer is made greater and the refractive index in the direction of stretching of the layer is made smaller. Thus, optically anisotropic substance (A) having a uniform phase difference can be efficiently and advantageously prepared.

(ii-1) A Layer Comprising Discotic Liquid Crystal Molecules

The discotic liquid crystal molecules are described in various references [for example, benzene derivatives described in C. Desrade et al., Mol. Crysr. Liq. Cryst., vol. 71, page 111 (1981); cyclohexane derivatives described in research reports by B. Kohne et al. and Angew. Chem., vol. 96, page 70 (1984); and aza crown-based molecules and phenylacetylene-based macrocycles described in research reports by J. M. Lehn et al., J. Chem. Commun., page 1794 (1985) and research reports by J. Zhang et al., J. Am. Chem. Sci. vol. 116, page 2655 (1994)]. In general, the discotic liquid crystal has a structure in which these molecules are placed as the mother nucleus and linear alkyl groups and alkoxyl groups and substituted benzoyloxyl group are added as substituents in the form of linear chains in a radial shape. Specific examples of the discotic crystal include compounds represented by the following formulae (1) and (2):

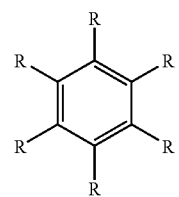

(1)

In formula (1), R represents one of groups expressed by the following formulae (i) to (iii):

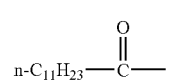

(i)

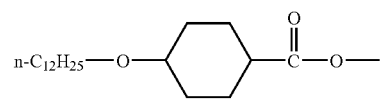

(ii)

-continued (iii)

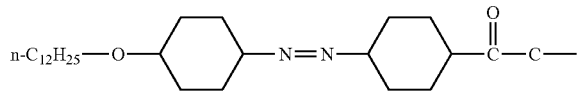

(2)

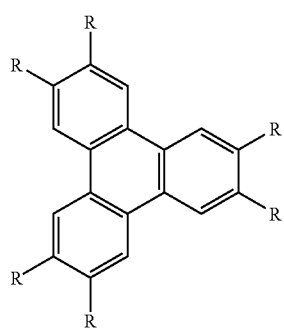

In formula (2), R represents one of groups expressed by formulae A to F:

A. 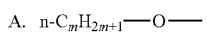
   (m = 2, 3, ... 15)

B. 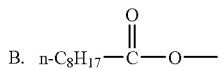

C. 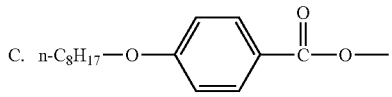

D. 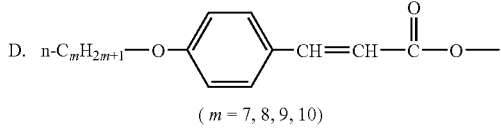
   (m = 7, 8, 9, 10)

E. 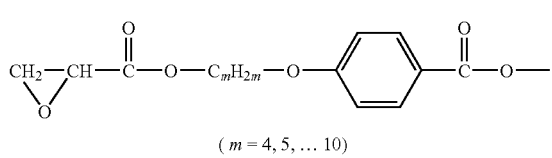
   (m = 4, 5, ... 10)

F. 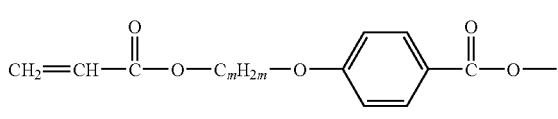
   (m = 4, 5, ... 10)

It is preferable that the layer comprising the discotic liquid crystal molecules comprises a layer in which the discotic liquid crystal molecules are oriented in the direction substantially perpendicular to the face of the substrate from the standpoint of efficiently and easily forming optically anisotropic member (A) and maintaining the stable and uniform phase difference for a long time. The substantially perpendicular orientation of the discotic liquid crystal molecules means a condition such that the discotic liquid crystal molecules are arranged in an orientation at an average oblique angle of 50 to 90° with respect to the face of the substrate. Examples of the substrate include films and plates made of glass and resins. From the standpoint of the decrease in the weight, the decrease in the thickness and the efficiency of production, the layer comprising the discotic liquid crystal molecules may be a laminate in which the discotic liquid crystal molecules are oriented substantially perpendicularly to the polarizer or optically anisotropic member (B) used in the present invention.

The process for producing optically anisotropic member (A) from a layer comprising the discotic liquid crystal molecules is not particularly limited. A process of laminating the discotic liquid crystal molecules to a substrate is preferable. From the standpoint of efficient control of the refractive index in the direction of the thickness of optically anisotropic member (A), the process of laminating the discotic liquid crystal molecules in a manner such that the discotic liquid crystal molecules are oriented substantially perpendicular to the face of the substrate is preferable. Optically anisotropic member (A) can be formed efficiently in accordance with the above process.

As for the process for arranging the discotic liquid crystal molecules in the perpendicular direction, this arrangement can be obtained by coating a film for perpendicular orientation with a coating fluid comprising the discotic liquid crystal molecules or a combination of the discotic liquid crystal molecules, a polymerization initiator described later and other additives, followed by fixing the substances in the coating fluid to the film, or by coating a film for perpendicular orientation with the coating fluid, followed by fixing the substances in the coating fluid to the film, then by removing the film for perpendicular orientation and laminating the remaining layer comprising the discotic liquid crystal molecules to a substrate.

Examples of the solvent used for preparation of the coating fluid include water and organic solvents. Examples of the organic solvent include amides such as N,N-dimethylformamide; sulfoxides such as dimethyl sulfoxide; heterocyclic compounds such as pyridine; hydrocarbons such as benzene and hexane; alkyl halides such as chloroform and dichloromethane; esters such as methyl acetate and butyl acetate; ketones such as acetone and methyl ethyl ketone; and ethers such as tetrahydrofuran and 1,2-dimethoxyethane. Two or more organic solvents may be used in combination.

The coating with the coating fluid can be conducted in accordance with a conventional process such as the extrusion coating process, the direct gravure coating process, the reverse gravure coating process and the die coating process.

The film for perpendicular orientation means a film having a small surface energy such that liquid crystal molecules can be oriented perpendicularly. The film for perpendicular orientation is, in general, formed with a polymer. In particular, from the standpoint of decreasing the surface energy of the film for perpendicular orientation, a polymer in which fluorine atom or a hydrocarbon group having 10 or more carbon atoms is introduced as a side chain of the polymer is preferable. The hydrocarbon group is an aliphatic group, an aromatic group or a combination of these groups. It is preferable that the main chain of the polymer has the structure of a polyimide or polyvinyl alcohol.

The degree of polymerization of the polymer used for the film for perpendicular orientation is preferably 200 to 5,000 and more preferably 300 to 3,000. The molecular weight of the polymer is preferably 9,000 to 200,000 and more preferably 13,000 to 130,000. Two or more polymers may be used in combination.

The film for perpendicular orientation can be formed by coating a substrate with the above polymer used for the film for perpendicular orientation. It is preferable that the film for perpendicular orientation is subjected to the rubbing treatment. The rubbing treatment can be conducted by rubbing the surface of the film having the polymer with paper or a cloth several times in a specific direction.

The perpendicularly oriented discotic liquid crystal molecules are fixed while the oriented condition is maintained. It is preferable that the fixing is conducted by polymerization. The liquid crystal molecules fixed in the perpendicularly oriented condition can maintain the oriented condition without the film for perpendicular orientation.

Examples of the process for the polymerization include the thermal polymerization using a thermal polymerization initiator and the photo-polymerization using a photopolymerization initiator. The photo-polymerization is preferable among the polymerization processes.

Examples of the photopolymerization initiator include α-carbonyl compounds (described in the specifications of the U.S. Pat. Nos. 2,367,661 and 2,367,670), acyloin ethers (described in the specification of the U.S. Pat. No. 2,448,828), aromatic acyloin compounds substituted with α-hydrocarbon (described in the specification of the U.S. Pat. No. 2,722,512), polynuclear quinone compounds (described in the specifications of the U.S. Pat. Nos. 3,046,127 and 2,951,758), combinations of triarylimidazole dimers and p-aminophenyl ketones (described in the specification of the U.S. Pat. No. 3,549,367), acridine and phenazine compounds (described in the specifications of Japanese Patent Application Laid-Open No. Showa 60(1985)-105667 and the U.S. Pat. No. 4,239,850) and oxadiazole compounds (described in the specification of the U.S. Pat. No. 4,212,970).

As described above, due to the formation of the layer in which the discotic liquid crystal molecules are perpendicularly oriented, the refractive index of this layer in the direction substantially parallel to the face of the disk of the perpendicularly oriented discotic liquid crystal molecules is increased, and the refractive index in the direction of the normal of the face of the disk is decreased. Therefore, optically anisotropic member (A) having a uniform phase difference can be formed efficiently and advantageously.

(i-2) Layer Comprising Lyotropic Liquid Crystal Molecules

The lyotropic liquid crystal molecule means a molecule exhibiting the liquid crystal property when the molecule is dissolved into a specific solvent in a concentration in a specific range (refer to Ekisho Binran (Handbook of Liquid Crystals), published by Maruzen Co., Ltd., page 3 or else). Specific examples include macromolecular lyotropic liquid crystal molecules obtained by dissolving a macromolecule having the main chain having a rod-like skeleton structure such as cellulose derivatives, polypeptides and nucleic acids; amphiphilic lyotropic liquid crystal molecules comprising a concentrated aqueous solution of an amphiphilic low molecular weight compound; and chromonic liquid crystal molecules comprising a solution of a low molecular weight compound having an aromatic ring provided with solubility in water, which are described in Japanese Patent Application Laid-Open No. Heisei 10(1998)-333145 and Mol. Cryst., Liq. Cryst., 1993, Vol. 225, 293-310.

It is preferable that the lyotropic liquid crystal molecules used in the present invention are characterized by that the molecules are oriented in a specific direction under shearing force. It is also preferable that the lyotropic liquid crystal molecules used in the present invention substantially do not have absorption in the region of visible light. Specific examples of the lyotropic liquid crystal molecule include compounds expressed by the following formulae (3) and (4):

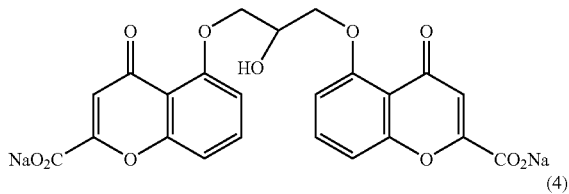

(3)

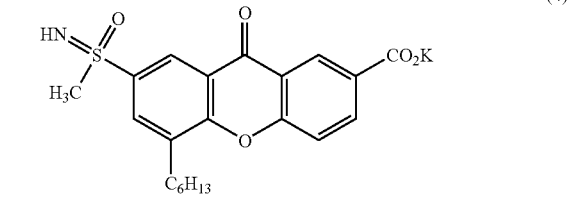

(4)

It is preferable that the layer comprising the lyotropic liquid crystal comprises a layer in which lyotropic liquid crystal molecules are oriented in the direction substantially perpendicular to the face of the substrate from the standpoint of efficiently and easily forming optically anisotropic member (A) and maintaining the stable and uniform phase difference for a long time. The substantially perpendicular orientation of the lyotropic liquid crystal molecules means a condition such that the lyotropic liquid crystal molecules are arranged in an orientation at an average oblique angle of 50 to 90° with respect to the face of the substrate. Examples of the substrate include films and plates made of glass and resins.

The process for producing optically anisotropic member (A) from a layer comprising the lyotropic liquid crystal molecules is not particularly limited. A process of laminating the lyotropic liquid crystal molecules to a substrate is preferable. From the standpoint of efficient control of the refractive index in the direction of the thickness of optically anisotropic member (A), the process of laminating the lyotropic liquid crystal molecules in a manner such that the lyotropic liquid crystal molecules are oriented substantially perpendicular to the face of the substrate under shearing force is preferable. Optically anisotropic substance (A) can be formed efficiently in accordance with the above process.

Examples of the process for perpendicularly orienting the lyotropic liquid crystal molecules under shearing force include a process of coating a substrate with a coating fluid comprising the lyotropic liquid crystal molecules or a combination of the discotic liquid crystal molecules, a polymerization initiator described later and other additives, followed by fixing the substances in the coating fluid to the film. It is preferable in the treatment for the orientation that a film for perpendicular orientation is not used so that the efficiency of production is made excellent, the decreases in the weight and the thickness can be achieved, damages to the substrate can be prevented, and the coating can be achieved with a uniform thickness.

Examples of the solvent used for preparation of the coating fluid include water and organic solvents. Examples of the organic solvent include amides such as N,N-dimethylformamide; sulfoxides such as dimethyl sulfoxide; heterocyclic compounds such as pyridine; hydrocarbons such as benzene and hexane; alkyl halides such as chloroform and dichloromethane; esters such as methyl acetate and butyl acetate; ketones such as acetone and methyl ethyl ketone; and ethers such as tetrahydrofuran and 1,2-dimethoxyethane. Two or more organic solvents may be used in combination.

The concentration of the solution comprising the lyotropic liquid crystal molecules is not particularly limited as long as the molecules used for the layer of optically anisotropic member (A) exhibit the liquid crystal property. The liquid crystal molecules are dissolved in the solvent in an amount preferably in the range of 0.0001 to 100 parts by weight and more preferably in the range of 0.0001 to 1 part by weight.

Where necessary, the solution comprising the lyotropic liquid crystal molecules may comprise conventional additives such as polymerization initiators, antioxidants, heat stabilizers, light stabilizers, ultraviolet light absorbents, antistatic agents, dispersants, chlorine scavengers, flame retardants, nucleating agents for crystallization, antiblocking agents, anticlouding agents, mold releases, pigments, organic and inorganic fillers, neutralizing agents, lubricants, decomposing agents, metal inactivators, antifouling agents, plasticizers, adhesives, anti-bacterial agents, other resins and thermoplastic elastomers as long as the effects of the present invention are not adversely affected. The additive is added to the solution comprising the lyotropic liquid crystal molecules in an amount, in general, in the range of 0 to 5 parts by weight and preferably in the range of 0 to 3 parts by weight.

The coating with the solution comprising the lyotropic liquid crystal molecules can be conducted in accordance with a conventional process such as the extrusion coating process, the direct gravure coating process, the reverse gravure coating process and the die coating process.

The lyotropic liquid crystal molecules perpendicularly oriented under shearing force are fixed while the oriented condition is maintained. Examples of the process for the fixing include removal of the solvent by drying, polymerization and a combination of these processes. Examples of the polymerization include the thermal polymerization using a thermal polymerization initiator and the photopolymerization using a photo-polymerization initiator.

As described above, due to the formation of a layer in which the lyotropic liquid crystal molecules are perpendicularly oriented, the refractive index in the direction substantially perpendicular to the direction of shearing of the lyotropic liquid crystal molecules perpendicularly oriented under shearing force is increased, and the refractive index in the direction of the shearing is decreased. Therefore, optically anisotropic member (A) having a uniform phase difference can be formed efficiently and advantageously.

(iii) A Layer Comprising a Photo-Isomerizable Substance

The photo-isomerizable substance means a compound which is sterically isomerized or structurally isomerized by light and, preferably, is further isomerized in the reverse direction by light having a different wavelength or by heat. Among the above compound, in general, many of compounds which change the structure accompanied with a change in the color tone in the visible region are known as the photochromic compounds. Examples of the photochromic compounds include azobenzene-based compounds, benzaldoxime-based compounds, azomethine-based compounds, stilbene-based compounds, spiropyrane-based compounds, spirooxazine-based compounds, fulgide-based compounds, diarylethene-based compounds, cinnamic acid-based compounds, retinal-based compounds and hemithioindigo-based compounds.

The above photo-isomerizable substance, which is a compound having a photo-isomerizable functional group (such as azo group and inner olefins), may be a low molecular weight compound or a polymer. When the photo-isomerizable substance is a polymer, the same function can be exhibited when the photo-isomerizable group is either in the main chain or in a side chain. The polymer may be a homopolymer or a copolymer. As for the relative amounts of monomer components in the copolymer, a suitable value can be used so that the properties of the copolymer such as the ability of photo-isomerization and Tg are suitably adjusted. The compound having the photo-isomerizable group may be a liquid crystal compound, at the same time. In other words, the liquid crystal compound may have a photo-isomerizable functional group in the molecule. The photo-isomerizable substance is specifically described in Kobunshi, 41 (12), (1992), page 884; "Chromic Materials and Application" (ed. by CMC), page 221; "Mechanochemistry" (ed. by Maruzen), page 21; and "Kobunshi Ronbunshu", vol. 147, No. 10 (1991), page 771. As a specific example of the photo-isomerizable substance, a compound expressed by formula (5) is shown in the following.

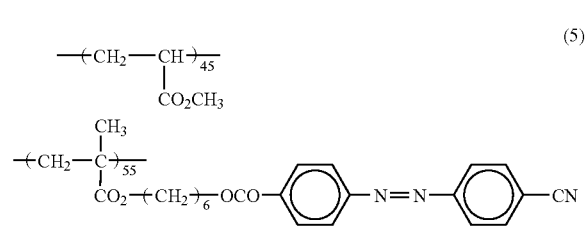

(5)

It is preferable that the layer comprising the photo-isomerizable substance is a layer comprising the photo-isomerizable substance which has been isomerized into a specific isomer from the standpoint of efficiently and easily forming optically anisotropic member (A) and maintaining the stable and uniform phase difference.

The process for producing optically anisotropic member (A) from a layer comprising the photo-isomerizable substance is not particularly limited. A process of coating a substrate with a solution comprising the photo-isomerizable substance to form a film, followed by irradiation with linearly polarized light via a drying step is preferable. The process comprising irradiation of the face of the film with linearly polarized light in the direction perpendicular to the face is more preferable. Optically anisotropic substance (A) can be formed efficiently in accordance with the above process. Examples of the substrate include films and plates made of glass and resins.

The solvent used for preparation of the solution comprising the photo-isomerizable substance is not particularly limited. Examples of the solvent include organic solvents such as methylene chloride, acetone, methanol and methyl ethyl ketone. The concentration of the coating fluid is not particularly limited and is selected so that viscosity suitable for the coating can be obtained. The concentration is preferably 1 to 50%. As the process for the coating, a conventional coating process such as the bar coating process and the roll coating process can be utilized.

For irradiation with the linearly polarized light, the irradiation can be conducted when the coating layer has been approximately dried. The approximately dried condition may be considered to be the condition in which the residual amount of the solvent in the coating layer is 10% by weight or less. It is preferable that the temperature of the irradiation with the linearly polarized light is in the range of Tg−50° C. to Tg+30° C. although the optimum temperature is different depending on the residual amount of the solvent. The source of the polarized light is not particularly limited. A mercury lamp or a halogen lamp can be advantageously used.

As described above, due to the irradiation of the layer comprising the photo-isomerizable substance with the linearly polarized light, the refractive index in the direction substantially perpendicular to the direction of the polarization axis of the light used for the irradiation is increased, and the refractive index in the direction of the polarization axis of the light used for the irradiation is decreased. Therefore, optically anisotropic member (A) having a uniform phase difference can be formed efficiently and advantageously.

In the liquid crystal display device of the present invention, it is preferable that $n_{xB} > n_{zB}$ when, with respect to optically anisotropic member (B), the refractive index in the direction of an in-plane slow axis is represented by $n_{xB}$, the refractive index in the direction in-plane and perpendicular to the direction of the in-plane slow axis is represented by $n_{yB}$, and the refractive index in the direction of the thickness is represented by $n_{zB}$, each measured using light having a wavelength of 550 nm. It is more preferable that $n_{xB}-n_{zB}$ is 0.00001 or greater. It is still more preferable that $n_{zB}-n_{zB}$ is 0.00003 or greater. When $n_x \leq n_{zB}$, there is the possibility that the contrast of the liquid crystal display device is decreased from that obtained when the optically anisotropic member is not disposed.

In the present invention, the absolute value of the difference between $n_{yB}$ and $n_{zB}$ is 0.003 or smaller, preferably 0.002 or smaller, more preferably 0.001 or smaller, still more preferably 0.0008 or smaller, still more preferably 0.0005 or smaller, still more preferably 0.0003 or smaller and most preferably 0.0001 or smaller. When the refractive indices do not satisfy the above relations, there is the possibility that the contrast of the liquid crystal display device is decreased from that obtained when the optically anisotropic member is not disposed.

Optical anisotropic member (B) used in the present invention is not particularly limited as long as the optically anisotropic member satisfies the relation of $n_{xB} > n_{zB}$. It is preferable that optically anisotropic member (B) comprises a layer comprising a material having a positive value of intrinsic birefringence. The material having a positive value of intrinsic birefringence means a material exhibiting a property such that, when light is incident on a layer having molecules oriented in a uniaxial order, a refractive index with respect to light in the direction of the orientation is greater than the refractive index with respect to light in the direction perpendicular to the direction of the orientation.

Examples of the material having a positive value of intrinsic birefringence include polymers having an alicyclic structure, polyolefin polymers, polycarbonate polymers, polyester polymers such as polyethylene terephthalate, polyvinyl chloride polymers, polysulfone polymers, polyether sulfone polymers, polyarylate polymers, acetate polymers such as triacetylcellulose and liquid crystalline resins. Among these materials, polymers having an alicyclic structure are preferable.

Examples of the polymer having an alicyclic structure include norbornene-based polymers, polymers based on cyclic olefins having a single ring, cyclic conjugate diene-based polymers, polymers of vinyl alicyclic hydrocarbons and hydrogenation products of these polymers. Among these polymers, norbornene-based polymers are preferable from the standpoint of transparency and the molding property.

Examples of the norbornene-based polymer include ring-opening polymers of monomers having a norbornene structure, ring-opening copolymers of monomers having a norbornene structure with other monomers copolymerizable with the monomers having the norbornene structure in accordance with the ring-opening copolymerization, hydrogenation products of these polymers, addition polymers of monomers having a norbornene structure, addition-type copolymers of monomers having a norbornene structure with other monomers copolymerizable with the monomers having a norbornene structure and hydrogenation products of these polymers. Among these polymers, hydrogenation products of ring-opening (co)polymers of monomers having a norbornene structure are preferable from the standpoint of transparency, the molding property, heat resistance, small moisture absorption, dimensional stability and light weight.

In the present invention, where necessary, the additives described for the material having a negative intrinsic birefringence may be added to the layer comprising the material having a positive value of intrinsic birefringence as long as the effects of the present invention are not adversely affected.

The layer comprising the material having a positive value of the intrinsic birefringence may further comprise other materials. However, a layer comprising the material having a positive value of the intrinsic birefringence alone is preferable.

The process for producing the layer comprising the material having a positive value of the intrinsic birefringence is not particularly limited. Examples of the process include conventional processes such as the flow coating process using a solution, the injection molding process and the melt extrusion process.

It is preferable that the layer comprising the material having a positive value of intrinsic birefringence is an oriented layer comprising the material having a positive value of intrinsic birefringence from the standpoint of easily and efficiently producing optically anisotropic member (B) and maintaining the stable and uniform phase difference for a long time.

The process for producing the oriented layer of the layer comprising the material having a positive value of intrinsic birefringence is not particularly limited. From the standpoint of uniformly and efficiently controlling the in-plane refractive index of the optically anisotropic member, the process of stretching the layer comprising the material having a positive value of intrinsic birefringence is preferable.

The process for stretching the layer comprising the material having a positive value of intrinsic birefringence is not particularly limited, and a conventional process can be applied. Specifically, the processes described for the material having a negative value of intrinsic birefringence can be applied.

As described above, by stretching the layer comprising the material having a positive value of intrinsic birefringence, the refractive index in the direction perpendicular to the direction of stretching of the layer is made greater and the refractive index in the direction of stretching of the layer is made smaller. Thus, optically anisotropic substance (B) having a uniform phase difference can be efficiently and advantageously prepared.

In the liquid crystal display device of the present invention, the content of the residual volatile components in optically anisotropic member (A) and optically anisotropic member (B) is preferably 0.1% by weight or smaller and more preferably 0.01% by weight or smaller. When the contents of residual volatile components in both of optically anisotropic member (A) and optically anisotropic member (B) exceed 0.1% by weight, there is the possibility that the phase difference is not uniform since the volatile components are discharged to the outside during the use, and internal stress is generated due to a dimensional change formed in optically anisotropic member (A) or optically anisotropic member (B).

When the contents of residual volatile components in both of optically anisotropic member (A) and optically anisotropic member (B) in the liquid crystal display device of the present invention are within the above range, the optical property exhibits excellent stability in that the liquid display device shows no decrease in the contrast of displayed images or uneven display under any environment even after the use for a long time.

The volatile components are substances contained in the optically anisotropic members in minute amounts and having molecular weights of 200 or smaller, such as residual monomers and solvents. The content of the volatile components can be determined as the total of the amounts of the substances having a molecular weight of 200 or smaller in the analysis of the optically anisotropic member in accordance with the gas chromatography.

The liquid crystal display device of the present invention is a liquid crystal display device of an in-plane switching mode which comprises a pair of polarizers which are a polarizer at an output side and a polarizer at an incident side and disposed at relative positions such that absorption axes of the polarizers are approximately perpendicular to each other and at least optically anisotropic member (A), optically anisotropic member (B) and a liquid crystal cell which are disposed between the pair of polarizers, wherein the in-plane slow axis of optically anisotropic member (A) and the in-plane slow axis of optically anisotropic member (B) are disposed at relative positions approximately parallel or approximately perpendicular to each other; and the in-plane slow axis of optically anisotropic member (A) and the absorption axis of a polarizer disposed closer to optically anisotropic member (A) are disposed at relative positions approximately parallel or approximately perpendicular to each other.

In the present invention, the angle between two axes is defined as the angle between a plane having one of the axes as the normal and another plane having the other of the axes as the normal, wherein the smaller angle is selected. In the present invention, that two axes are disposed at relative positions approximately parallel to each other means that the angle between the two axes is 0 to 3°, and that two axes are disposed at relative positions approximately perpendicular to each other means that the angle between the two axes is 87 to 90°.

It is preferable that optically anisotropic member (A) and optically anisotropic member (B) used in the present invention have uniform optical properties. It is more referable that the dispersion of the in-plane retardation is 10 nm or smaller, still more preferably 5 nm or smaller and most preferably 2 nm or smaller. When the dispersion of the in-plane retardation is within the above range, the quality of display of the liquid crystal display device of the present invention can be made excellent. The dispersion of the in-plane retardation means the difference between the maximum value and the minimum value of the in-plane retardation when the in-plane retardation is measured over the entire face of the optically anisotropic members in the condition such that the incident angle of light is 0°, i.e., when the incident light and the surfaces of optically anisotropic member (A) and optically anisotropic member (B) used in the present invention are perpendicular to each other.

The in-plane switching (IPS) mode, which is one of the modes of the liquid crystal display device of the present invention, uses liquid crystal molecules homogenously oriented in the horizontal direction and two polarizers having transmission axes disposed at relative positions perpendicular to each other, one transmission axis being in the vertical direction and the other transmission axis being in the horizontal direction with respect to the front face of the display. Therefore, the sufficient contrast can be obtained since the two transmission axes are in such relative positions that the two transmission axes are seen perpendicularly when the face of the display is observed at a horizontally or vertically oblique angle and, moreover, the homogeneously oriented liquid crystal layer shows little birefringence unlike liquid crystal layers of the twisted mode. However, when the face of the display is observed obliquely at the angle of 45°, the angle between the transmission axes of the two polarizers shifts from 90°, and leak of light takes place due to birefringence of the transmitted light. Therefore, the sufficiently dark color is not obtained, and the contrast decreases. To overcome this drawback, optically anisotropic member (A) and optically anisotropic substance (B) are disposed between two polarizers of the liquid crystal display device of the in-plane switching mode in a manner such that the in-plane slow axis of optically anisotropic member (A) and the in-plane slow axis of optically anisotropic member (B) are disposed at relative positions approximately parallel to each other, and the in-plane slow axis of optically anisotropic member (A) and the transmission axis of the polarizer disposed closer to optically anisotropic member (A) are disposed at relative positions approximately parallel or approximately perpendicular to each other. Due to this arrangement of relative positions, the phase difference formed by the liquid crystal in the liquid crystal cell is compensated, and compensation for the angle of field of the polarizer is also achieved. Due to the above effect, the phase difference formed by the transmitted light is effectively compensated to prevent the leak of light, and excellent contrast can be obtained in observation at any of the entire angle. This effect is considered to be exhibited also in the cases of liquid crystal display devices of other modes. In particular, the effect is remarkable in the case of the IPS mode.

In the liquid display device of the present invention, a suitable polarizer which is obtained from a film comprising a suitable conventional vinyl alcohol-based polymer such as polyvinyl alcohol and polyvinyl alcohol with a partial formal treatment after suitable treatments such as the dying with dichroic substances (such as iodine and dichroic dyes), the stretching treatment and the crosslinking treatment in a suitable order in accordance with suitable processes and transmits linearly polarized light on incidence of natural light, can be used. In particular, a polarizer exhibiting excellent transmission of light and degree of polarization is preferable. In general, the thickness of the polarizer is 5 to 80 μm. However, the thickness is not limited to this range.

In general, protective films are attached to both faces of the polarizer, and the obtained laminate is used as a polarizer plate.

As the protective film in the polarizer, a suitable transparent film can be used. In particular, films comprising a polymer exhibiting excellent transparency, mechanical strength, heat stability and property of shielding moisture are preferable. Examples of the polymer include polymers having an alicyclic structure, polyolefin polymers, polycarbonate polymers, polyester polymers such as polyethylene terephthalate, polyvinyl chloride polymers, polystyrene polymers, polyacrylonitrile polymers, polysulfone polymers, polyether sulfone polymers, polyarylate polymers, acetate polymers such as triacetylcellulose and copolymers of (meth)acrylic acid esters and vinyl aromatic compounds. Among these polymers, triacetylcellulose, polyethylene terephthalate and polymer resins having an alicyclic structure are preferable from the standpoint of transparency and light weight, and polyethylene terephthalate and polymer resins having an alicyclic structure are more preferable from the standpoint of dimensional stability and control of the thickness of the film. The optically anisotropic member used in the present invention can work also as the protective film for the polarizer so that the thickness of the liquid crystal display device can be decreased.

In the present invention, when the optically anisotropic member and the polarizer are in contact with each other, the optically anisotropic member may replace the protective film of the polarizer described above and can be attached to the polarizer using a suitable means such as an adhesive or a pressure-sensitive adhesive.

Examples of the adhesive and the pressure-sensitive adhesive include adhesives and pressure-sensitive adhesives based on acrylic polymers, silicones, polyesters, polyurethanes, polyethers and rubbers. Among these materials, acrylic adhesives and pressure-sensitive adhesives are preferable from the standpoint of heat resistance and transparency.

As the process for lamination, a conventional process for lamination can be used. Examples of the process for lamination include the process of laminating the optically anisotropic member and the polarizer which are each cut into a desired size, and the process of laminating long sheets of the optically anisotropic member and the polarizer in accordance with the roll-to-roll process.

Examples of the polymer resin having an alicyclic structure include norbornene-based polymers, polymers based on cyclic olefins having a single ring, cyclic conjugate diene-based polymers, vinyl alicyclic hydrocarbon polymers and hydrogenation products of these polymers. Among these polymers, norbornene-based polymers are preferable from the standpoint of transparency and the molding property.

Examples of the norbornene-based polymer include ring-opening polymers of norbornene-based monomers, ring-opening copolymers of norbornene-based monomers with other monomers copolymerizable with the norbornene-based monomers in accordance with the ring-opening copolymerization, hydrogenation products of these polymers, addition polymers of norbornene-based monomers and addition-type copolymers of norbornene-based monomers with other monomers copolymerizable with the norbornene-based monomers. Among these polymers, hydrogenation products of ring-opening (co)polymers of norbornene-based monomers are preferable from the standpoint of transparency.

The polymer resin having an alicyclic structure can be selected from conventional polymers disclosed, for example, in Japanese Patent Application Laid-Open No. 2002-321302.

The protective film for the polarizer at the side of vision in the liquid crystal display device of the present invention can be prepared by laminating a hard coat layer and a low refractive index layer in this order.

The hard coat layer is a layer having a great hardness of the surface. Specifically, the hard coat layer is a layer having a hardness of "HB" or harder measured in accordance with the test method of pencil hardness (using a glass plate as the test plate) described in Japanese Industrial Standard K 5600-5-4. It is preferable that the hard coat layer has a great refractive index. When the hard coat layer has a great refractive index, formation of images due to outside light can be prevented, and a polarizer exhibiting excellent scratch resistance and property for preventing fouling can be prepared. The average thickness of the hard coat layer is not particularly limited. The thickness is, in general, 0.5 to 30 μm and preferably 3 to 15 μm. The great refractive index means a refractive index greater than the refractive index of the low refractive index layer which will be laminated later and is preferably 1.55 or greater. The refractive index can be obtained by using, for example, a conventional spectro-elipsometer.

The material for constituting the hard coat layer is not particularly limited as long as the material exhibits a hardness of "HB" or harder measured in accordance with the test method of pencil hardness (using a glass plate as the test plate) described in Japanese Industrial Standard K 5600-5-4.

Examples of the above material include organic hard coat materials such as organic silicone-based materials, melamine-based materials, epoxy-based materials, acrylic materials and urethane acrylate-based materials; and inorganic hard coat materials such as silicon dioxide-based materials. Among these materials, urethane acrylate-based hard coat materials and polyfunctional acrylate-based hard coat materials are preferable from the standpoint of excellent adhesive ability and productivity.

In the present invention, it is preferable that the hard coat layer has a refractive index of 1.5 or greater, more preferably 1.53 or greater and most preferably 1.55 or greater. When the refractive index of the hard coat layer is in this range, an excellent property of preventing reflection in a wide band range is exhibited, the design of the low refractive index layer to be laminated on the hard coat layer is facilitated, and a laminate film for optical applications exhibiting excellent scratch resistance can be obtained.

It is preferable that the hard coat layer further comprises particles of an inorganic oxide.

By adding particles of an inorganic oxide, a hard coat layer exhibiting excellent scratch resistance and having a refractive index of 1.55 or greater can be easily formed.

As the particles of an inorganic oxide which can be used for the hard coat layer, particles having a great refractive index are preferable. Specifically, particles of an inorganic oxide having a refractive index of 1.6 or greater are preferable, and particles of an inorganic oxide having a refractive index of 1.6 to 2.3 are more preferable.

Examples of the particles of an inorganic oxide having a great refractive index include particles of titania (titanium oxide), zirconia (zirconium oxide), zinc oxide, tin oxide, cerium oxide, antimony pentaoxide, indium oxide doped with tin (ITO), tin oxide doped with antimony (ATO), tin oxide doped with phosphorus (PTO), indium oxide doped with zinc (IZO), zinc oxide doped with aluminum (AZO) and tin oxide doped with fluorine (FTO).

Among these particles, particles of antimony pentaoxide are suitable as a component for adjusting the refractive index due to the great refractive index and excellent balance between electric conductivity and transparency.

The low refractive index layer is a layer having a refractive index smaller than that of the hard coat layer. The refractive index of the low refractive index layer is preferably 1.36 or smaller, more preferably 1.35 to 1.25, and most preferably 1.34 to 1.30. When the refractive index is within the above range, a protective film for a polarizer plate exhibiting excellent balance between visibility, scratch resistance and strength can be formed. The thickness of the low refractive index layer is preferably 10 to 1,000 nm and more preferably 30 to 500 nm.

The material constituting the low refractive index layer is not particularly limited as long as the layer having a refractive index within the above range can be formed. Aero gel is preferable since the control of the refractive index is easy and water resistance is excellent.

The aero gel is a transparent porous substance having minute pores dispersed in a matrix. Most of the pores have a size of 200 nm or smaller. The content of the pore is, in general, 10% by volume or greater and 60% by volume or smaller and preferably 20% by volume or greater and 40% by volume or smaller.

Examples of the aero gel having dispersed minute pores include silica aero gel and porous substances containing hollow particles dispersed in a matrix.

The aero gel can be produced by supercritical drying of a gel-form compound which is obtained by polymerization of an alkoxysilane with hydrolysis, has a skeleton structure of silica and is in the swollen condition, as disclosed in the U.S. Pat. Nos. 4,402,927, 4,432,956 and 4,610,863. The supercritical drying can be conducted, for example, by replacing a portion or the entire amount of a solvent in a gel-form compound with a drying fluid such as carbon dioxide and an alcohol, followed by bringing the resultant compound into a supercritical condition and removing the drying fluid (as a gas) which has changed into the gas phase from the supercritical condition. The silica aero gel may be produced using sodium silicate as the raw material in a manner described above as disclosed in the U.S. Pat. Nos. 5,137,279 and 5,124,364. The refractive index of the silica aero gel can be changed as desired by adjusting relative amounts of raw materials.

Examples of the porous substances containing hollow particles dispersed in a matrix include porous substances in which hollow fine particles having pores at the inside are dispersed in a binder resin as disclosed in Japanese Patent Application Laid-Open Nos. 2001-233611 and 2003-149642.

The binder resin can be selected from resins satisfying requirements such as dispersion of hollow fine particles, transparency of the porous substance and strength of the porous substance. Examples of the binder resin include conventional resins used for coating such as polyester resins, acrylic resins, urethane resins, vinyl chloride resins, epoxy resins, melamine resins, fluororesins, silicone resins, butyral resins, phenol resins, vinyl acetate resins, ultraviolet light curable resins, electron beam curable resins, emulsion resins, water-soluble resins, hydrophilic resins, mixtures of these resins and copolymers and modified substances of these resins; and hydrolyzable organic silicon compounds such as alkoxysilanes and hydrolysis products thereof.

Among the above resins, acrylic resins, epoxy resins, urethane resins, silicone resins, hydrolyzable organic silicon compounds such as alkoxysilanes and hydrolysis products thereof are preferable from the standpoint of dispersion of the fine particles and strength of the porous substance.

The hydrolyzable organic silicon compound such as alkoxysilanes and hydrolysis products thereof are formed from one or more compounds selected from the group consisting of compounds (a) and products (b) and (c) shown in the following:

(a) Compounds represented by formula (6):

$$SiX_4 \quad (6)$$

(b) Products of partial hydrolysis of at least one of compounds represented by formula (6)

(c) Products of complete hydrolysis of at least one of compounds represented by formula (6)

and have a bond represented by  —(O—Si)$_m$—O— (m representing a natural number) in the molecule.

The hollow fine particles are not particularly limited as long as the particles are fine particles of an inorganic compound. Inorganic fine particles having a hollow formed at the inside of an outer shell are preferable, and silica-based hollow fine particles are more preferable. As the inorganic hollow fine particles, particles having (A) a single layer of an inorganic oxide, (B) a single layer of a complex oxide comprising inorganic oxides of different types and (C) a double layer comprising layers (A) and (B) described above can be used.

The outer shell may be a porous shell having fine open pores or a closed shell having no open pores so that the hollow at the inside is shielded from the outside of the shell. As the outer shell, a coating layer comprising a plurality of coating layers of an inorganic oxide which comprises an inner first coating layer of an inorganic oxide and an outer second coating layer of an inorganic oxide is preferable. By disposing the outer second coating layer of an inorganic oxide at the outside, the outer shell can be made dense by closing pores of the outer shell, or inorganic hollow fine particles having a hollow completely shielded from the outside can be obtained. It is preferable that an organic silicon compound having fluorine atom is used for forming the outer second coating layer comprising an inorganic oxide since the refractive index can be decreased, dispersion into organic solvents can be improved, and the property of preventing fouling can be provided. Examples of the organic silicon compound having fluorine atom include 3,3,3-trifluoropropyltrimethoxy-silane, methyl-3,3,3-trifluoropropyldimethoxysilane, heptadecafluoro-decylmethyldimethoxysilane, heptadecafluorodecyltrichlorosilane, heptadecafluorodecyltrimethoxysilane, trifluoropropyltrimethoxysilane and tridecafluorooctyltrimethoxysilane.

The thickness of the outer shell is preferably in the range of 1 to 50 nm and more preferably in the range of 5 to 20 nm. When the thickness of the outer shell is smaller than 1 nm, there is the possibility that the inorganic hollow fine particles cannot maintain the prescribed shape. When the thickness of the outer shell exceeds 50 nm, the hollow at the inside of the inorganic hollow particles is small. As the result, there is the possibility that the relative volume of the hollow is decreased, and the decrease in the refractive index is insufficient.

The average diameter of the inorganic fine particles is not particularly limited. The average diameter is preferably 5 to 2,000 nm and more preferably 20 to 100 nm. When the average diameter is smaller than 5 nm, the effect of the hollows to decrease the refractive index is small. When the average diameter exceeds 2,000 nm, transparency extremely deteriorates, and the contribution of diffusion and reflection increases. The average diameter of the fine particles is the number-average diameter obtained by the observation using a transmission electron microscope.

The protective film for the polarizer at the side of vision has a maximum reflectance of light having wavelengths in the range of 430 to 700 nm of preferably 1.4% or smaller and more preferably 1.3% or smaller at an incident angle of 5°. The reflectance of light having a wavelength of 550 nm is preferably 0.7% or smaller and more preferably 0.6% or smaller at an incident angle of 5°.

The maximum reflectance of light having wavelengths in the range of 430 to 700 nm is preferably 1.5% or smaller and more preferably 1.4% or smaller at an incident angle of 20°, and the reflectance of light having a wavelength of 550 nm is preferably 0.9% or smaller and more preferably 0.8% or smaller at an incident angle of 20°.

When each reflectance is within the respective range described above, a polarizer plate showing no images from outside light or glare and providing excellent vision can be obtained.

As for the reflectances described above, the reflectance of light having a wavelength of 550 nm and the maximum reflectance of light having wavelengths in the range of 430 to 700 nm are obtained at incident angles of 5° and 20° using a spectrophotometer (an ultraviolet, visible and near infrared spectrophotometer V-550; manufactured by NIPPON BUNKO Co., Ltd.).

The steel wool test is conducted by reciprocally moving steel wool #0000 ten times on the surface of a protective film of a polarizer at the side of vision under application of a load of 0.025 MPa, and then the change in the condition of the surface after the test is measured.

For evaluation of the change in the reflectance before and after the steel wool test, the measurement is conducted at arbitrarily selected 5 different positions on the surface before and after the test, and the arithmetic average of the obtained values is calculated.

In the above steel wool test, the change in the reflectance on the protective film of a polarizer at the side of vision before and after the test is preferably 10% or smaller and more preferably 8% or smaller. When the change in the reflectance exceeds 10%, blurred images may be formed or glare may arise.

The change in the reflectance before and after the steel wool test is obtained in accordance with the following equation (1.1). $R^b$ represents the reflectance before the steel wool test, and $R^a$ represents the reflectance after the steel wool test.

$$\Delta R = (R^b - R^a)/R^b \times 100 (\%) \quad (1.1)$$

Figure 2:
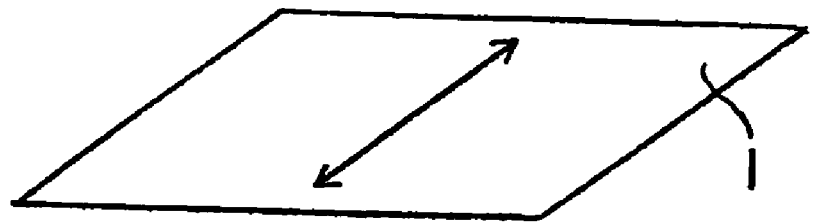
FIG. 2 shows a diagram exhibiting a preferable arrangement in the liquid crystal display device of the present invention.
Figure 2:
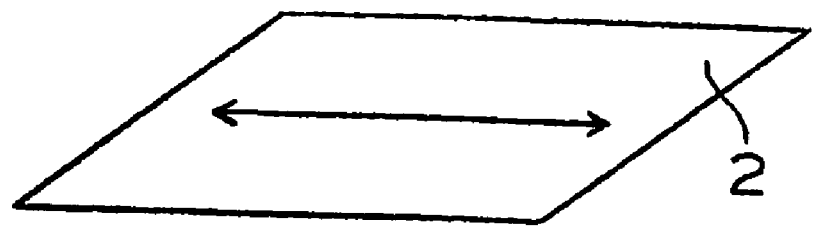
Figure 2:
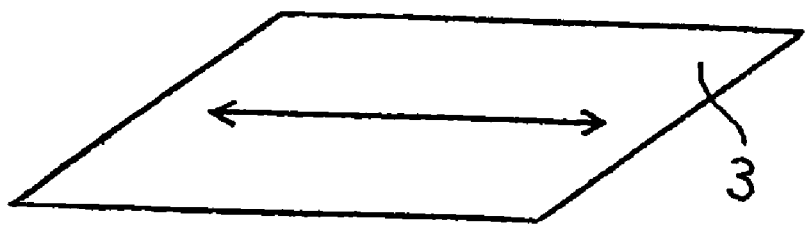
Figure 2:
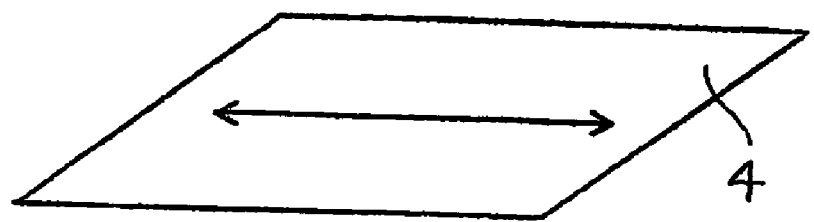
Figure 2:
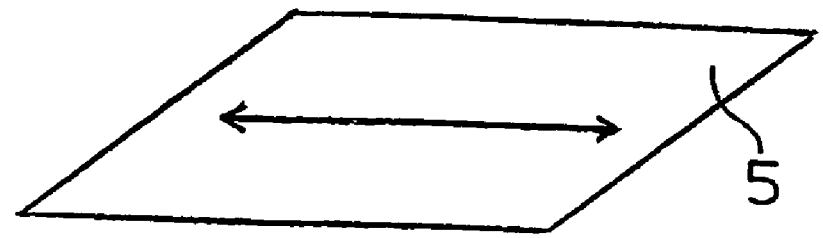

The embodiments of the liquid crystal display device of the present invention comprising optically anisotropic member (A) and optically anisotropic member (B) comprise 12 embodiments of the preferable arrangement. In the following, 6 embodiments of the preferable arrangement in which "the polarizer of the output side" is placed at the side of vision, and "the polarizer of the incident side" is placed at the side of the back light will be described. The remaining 6 embodiments of the preferable arrangement are embodiments of the preferable arrangement obtained by exchanging the polarizer at the side of vision and the polarizer at the side of the back light with each other (i.e., the arrangement in which "the polarizer of the incident side" is placed at the side of vision, and "the polarizer of the output side" is placed at the side of the back light). These embodiments of the preferable arrangement show the same characteristics of the angle of field with those before the exchange of the polarizer at the side of vision and the polarizer at the side of the back light with each other. For example, the embodiments of the preferable arrangement shown in FIG. 1 and FIG. 2 show the same characteristics of the angle of field with respect to luminance, contrast and color tone. The arrow in the figures shows the absorption axis for the polarizers (1: the polarizer at the incident side; 5: the polarizer at the output side), the in-plane slow axis under application of no voltage for the liquid crystal cell 2, and the in-plane slow axis for the optically anisotropic members (3: optically anisotropic member (A); 4: optically anisotropic member (B).

In the first and second embodiments of the preferable arrangement, optically anisotropic member (A) and optically anisotropic member (B) are disposed between the polarizer at the incident side (the polarizer at the side of the back light) and the liquid crystal cell of the liquid crystal display device.

(I-1) The First Embodiment of the Preferable Arrangement

Figure 3:
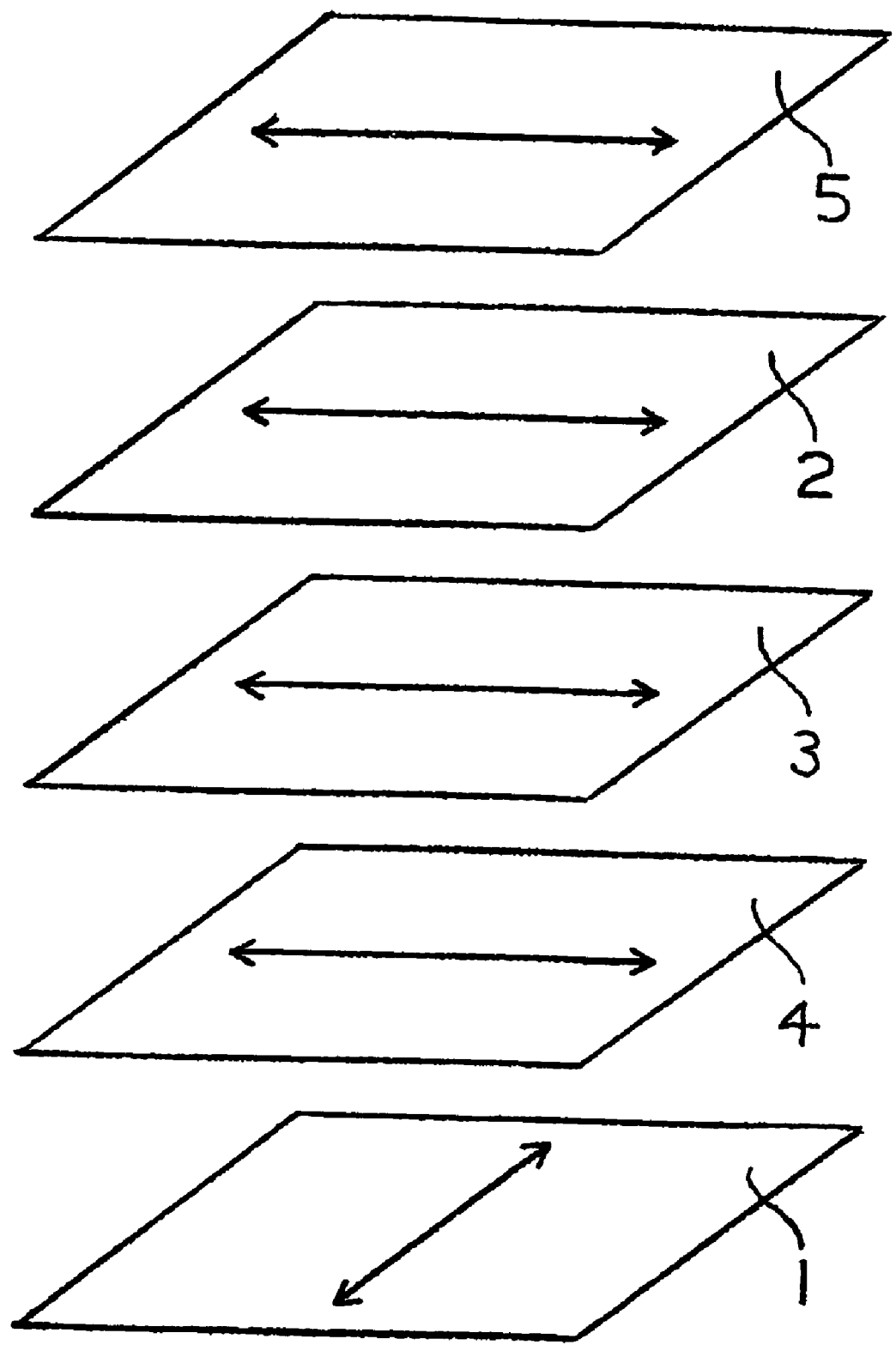
FIG. 3 shows a diagram exhibiting an embodiment having arrangement I-1 in the liquid crystal display device of the present invention.

FIG. 3 shows a diagram exhibiting the first embodiment of the preferable arrangement (referred to as arrangement I-1, hereinafter) of the liquid crystal display device of the present invention. In arrangement I-1, the absorption axis of the polarizer at the output side and the in-plane slow axis of the liquid crystal of the liquid crystal cell under application of no voltage are disposed at relative positions parallel to each other. The in-plane slow axes of optically anisotropic member (A) and optically anisotropic member (B) are disposed at relative positions approximately parallel to each other. It is preferable that the in-plane slow axis of optically anisotropic member (B) and the in-plane slow axis of the liquid crystal of the liquid crystal cell under application of no voltage are disposed at relative positions approximately parallel to each other, and optically anisotropic member (A) is disposed at a position closer to the liquid cell than optically anisotropic member (B). Due to the above relative positions of optically anisotropic member (A), optically anisotropic member (B), the liquid crystal cell and the two polarizers, the minimum value of the contrast can be made 30 or greater at polar angles of 0 to 80°.

In arrangement I-1, the preferable combination of the in-plane retardation $R_e(A)$ (the unit: nm) and the retardation in the direction of the thickness $R_{th}(A)$ (the unit: nm) of optically anisotropic member (A) and the in-plane retardation $R_e(B)$ (the unit: nm) and the retardation in the direction of the thickness $R_{th}(B)$ (the unit: nm) of optically anisotropic member (B) is: $10 \leq R_e(A) \leq 1,000$, $-500 \leq R_{th}(A) \leq -5$, $10 \leq R_e(B) \leq 500$ and $5 \leq R_{th}(B) \leq 250$. The more preferable combinations are: (1) $10 \leq R_e(A) \leq 360$, $-180 \leq R_{th}(A) \leq -5$, $10 \leq R_e(B) \leq 360$ and $5 \leq R_{th}(B) \leq 360$; (2) $350 \leq R_e(A) \leq 470$, $-235 \leq R_{th}(A) \leq -175$, $450 \leq R_e(B) \leq 500$ and $225 R_{th}(B) \leq 250$; and (3) $640 \leq R_e(A) \leq 700$, $-350 \leq R_{th}(A) \leq -320$, $20 \leq R_e(B) \leq 100$ and $10 \leq R_{th}(B) \leq 50$. The still more preferable combination is: $30 \leq R_e(A) \leq 320$, $-160 \leq R_{th}(A) \leq -15$, $30 \leq R_e(B) \leq 320$ and $20 \leq R_{th}(B) \leq -320$. The most preferable combination is: $70 \leq R_e(A) \leq 120$, $-65 \leq R_{th}(A) \leq -25$, $50 \leq R_e(B) \leq 110$ and $25 \leq R_{th}(B) \leq 70$.

In the present invention, the in-plane retardation $R_e$ and the retardation in the direction of thickness $R_{th}$ can be obtained in accordance with the following equations (1.2) and (1.3). In the equations, $n_x$, $n_y$ and $n_z$ each represent the refractive index (−), and d represents the thickness (nm).

$$R_e = (n_x - n_y) \times d \quad (1.2)$$

$$R_{th} = [(n_x + n_y)/2 - n_z] \times d \quad (1.3)$$

(I-2) The Second Embodiment of the Preferable Arrangement

Figure 4:
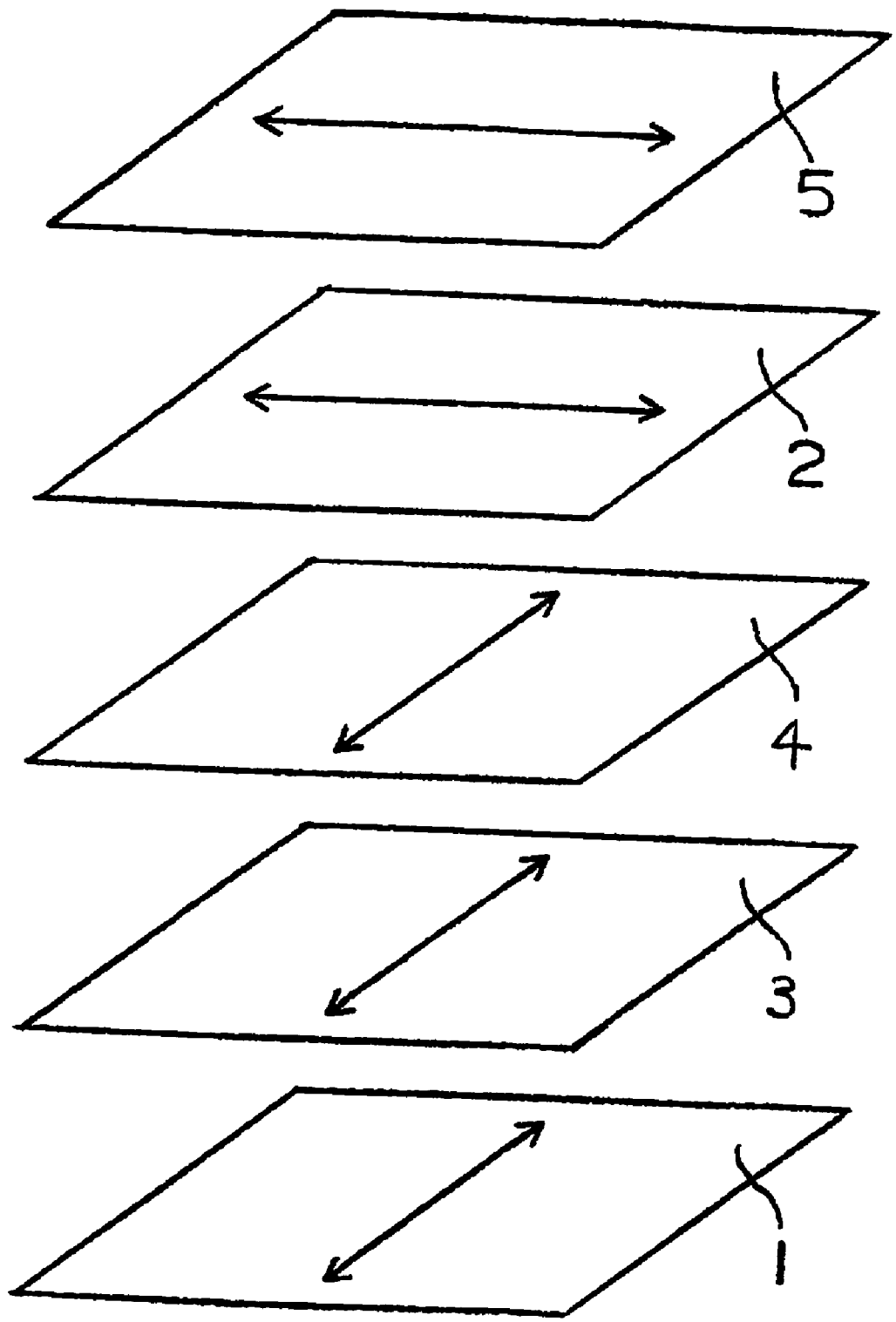
FIG. 4 shows a diagram exhibiting an embodiment having arrangement I-2 in the liquid crystal display device of the present invention.

FIG. 4 shows a diagram exhibiting the second embodiment of the preferable arrangement (referred to as arrangement I-2, hereinafter) of the liquid crystal display device of the present invention. In arrangement I-2, the absorption axis of the polarizer at the output side and the in-plane slow axis of the liquid crystal of the liquid crystal cell under application of no voltage are disposed at relative positions parallel to each other. The in-plane slow axes of optically anisotropic member (A) and optically anisotropic member (B) are disposed at relative positions approximately parallel to each other. It is preferable that the in-plane slow axis of optically anisotropic member (B) and the in-plane slow axis of the liquid crystal of the liquid crystal cell under application of no voltage are disposed at relative positions approximately perpendicular to each other, and optically anisotropic member (B) is disposed at a position closer to the liquid cell than optically anisotropic member (A). Due to the above relative positions of optically anisotropic member (A), optically anisotropic member (B), the liquid crystal cell and the two polarizers, the minimum value of the contrast can be made 30 or greater at polar angles of 0 to 80°.

In arrangement I-2, the preferable combination of the in-plane retardation $R_e(A)$ (the unit: nm) and the retardation in the direction of the thickness $R_{th}(A)$ (the unit: nm) of optically anisotropic member (A) and the in-plane retardation $R_e(B)$ (the unit: nm) and the retardation in the direction of the thickness $R_{th}(B)$ (the unit: nm) of optically anisotropic member (B) is: $10 \leq R_e(A) \leq 1,000$, $-500 \leq R_{th}(A) \leq -5$, $10 \leq R_e(B)$ ≦1,000 and 5≦$R_{th}$(B)≦500. The more preferable combinations are: (1) 10≦$R_e$(A)≦310, −240 $R_{th}$(A)≦−5, 10≦$R_e$(B)≦300 and 5≦$R_{th}$(B)≦100; (2) 350≦$R_e$(A)≦470, −235≦$R_{th}$(A)≦−175, 450≦$R_e$(B)≦500 and 225≦$R_{th}$(B)≦250; (3) 640≦$R_e$(A)≦700, −350≦$R_{th}$(A)≦−320, 20≦$R_e$(B)≦100 and 10≦$R_{th}$(B)≦50; and (4) 730≦$R_e$(A)≦760, −570≦$R_{th}$(A)≦−540, 240≦$R_e$(B)≦280 and 120≦$R_{th}$(B)≦140. The still more preferable combination is: 30≦$R_e$(A)≦150, −90≦$R_{th}$(A)≦−15, 40≦$R_e$(B)≦150 and 20≦$R_{th}$(B)≦75. The most preferable combination is: 60≦$R_e$(A)≦110, −70≦$R_{th}$(A)≦−25, 70≦$R_e$(B)≦120 and 25≦$R_{th}$(B)≦65.

In the third and fourth embodiments of the preferable arrangement, optically anisotropic member (A) and optically anisotropic member (B) are disposed between the polarizer at the output side (the polarizer at the side of vision) and the liquid crystal cell of the liquid crystal display device.

(II-1) The Third Embodiment of the Preferable Arrangement

Figure 5:
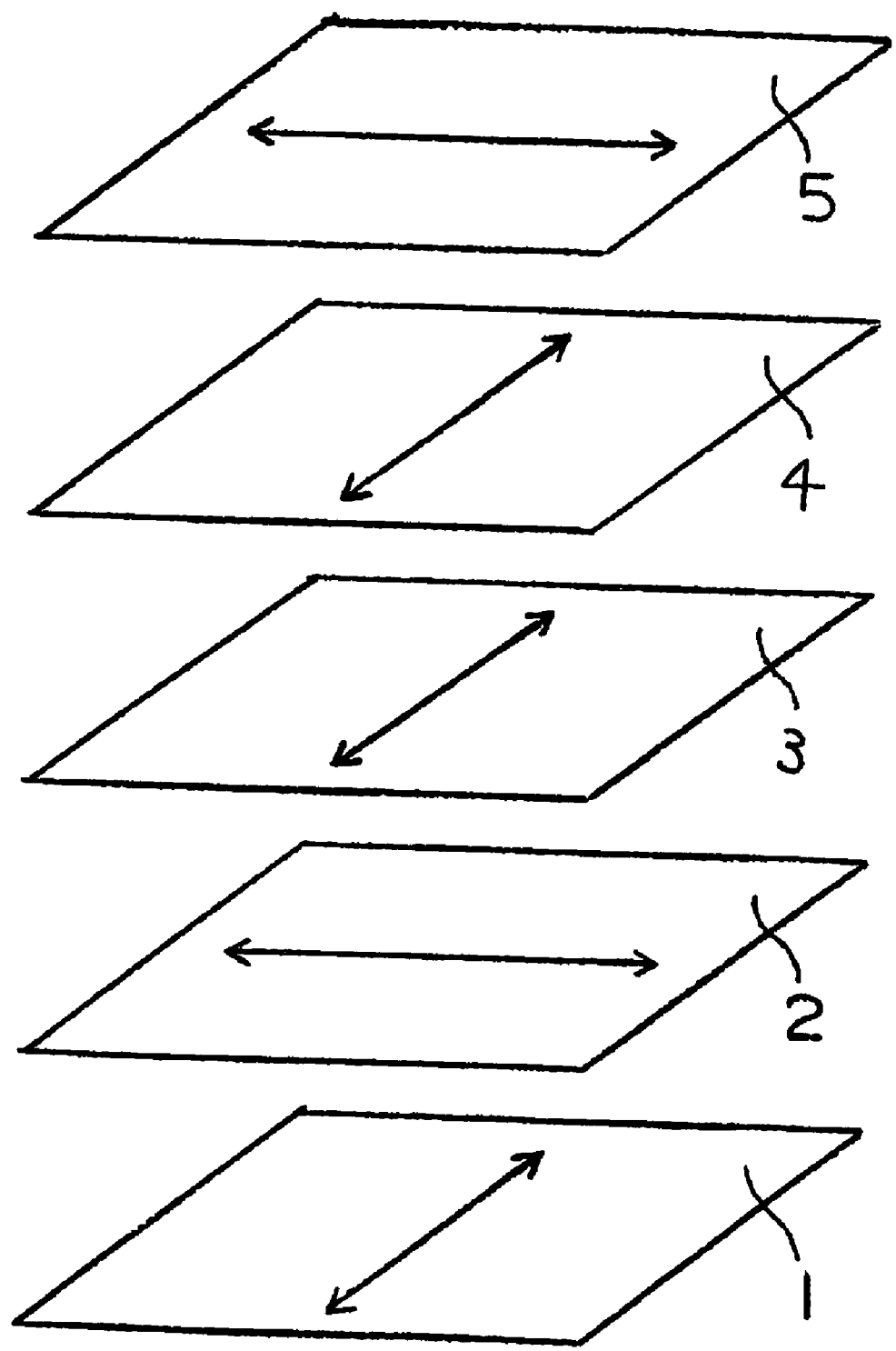
FIG. 5 shows a diagram exhibiting an embodiment the arrangement II-1 in the liquid crystal display device of the present invention.

FIG. 5 shows a diagram exhibiting the third embodiment of the preferable arrangement (referred to as arrangement II-1, hereinafter) of the liquid crystal display device of the present invention. In arrangement II-1, the absorption axis of the polarizer at the output side and the in-plane slow axis of the liquid crystal of the liquid crystal cell under application of no voltage are disposed at relative positions parallel to each other. The in-plane slow axes of optically anisotropic member (A) and optically anisotropic member (B) are disposed at relative positions approximately parallel to each other. It is preferable that the in-plane slow axis of optically anisotropic member (B) and the in-plane slow axis of the liquid crystal of the liquid crystal cell under application of no voltage are disposed at relative positions approximately perpendicular to each other, and optically anisotropic member (A) is disposed at a position closer to the liquid cell than optically anisotropic member (B). Due to the above relative positions of optically anisotropic member (A), optically anisotropic member (B), the liquid crystal cell and the two polarizers, the minimum value of the contrast can be made 30 or greater at polar angles of 0 to 80°.

In arrangement II-1, the preferable combination of the in-plane retardation $R_e$(A) (the unit: nm) and the retardation in the direction of the thickness $R_{th}$(A) (the unit: nm) of optically anisotropic member (A) and the in-plane retardation $R_e$(B) (the unit: nm) and the retardation in the direction of the thickness $R_{th}$(B) (the unit: nm) of optically anisotropic member (B) is: 10≦$R_e$(A)≦1,000, −500≦$R_{th}$(A)≦−5, 10≦$R_e$(B)≦1,000 and 5≦$R_{th}$(B)≦500. The more preferable combinations are: (1) 150≦$R_e$(A)≦470, −235≦$R_{th}$(A)≦−75, 20≦$R_e$(B)≦480 and 10≦$R_{th}$(B)≦240; and (2) 640≦$R_e$(A)≦760, −380≦$R_{th}$(A)≦−320, 370≦$R_e$(B)≦470 and 185≦$R_{th}$(B)≦235. The still more preferable combination is: 320≦$R_e$(A)≦400, −200≦$R_{th}$(A)≦−160, 50≦$R_e$(B)≦170 and 25≦$R_{th}$(B)≦85. The most preferable combination is: 340≦$R_e$(A)≦380, −200≦$R_{th}$(A)≦−160, 90≦$R_e$(B)≦130 and 35≦$R_{th}$(B)≦75.

(II-2) The Fourth Embodiment of the Preferable Arrangement

Figure 6:
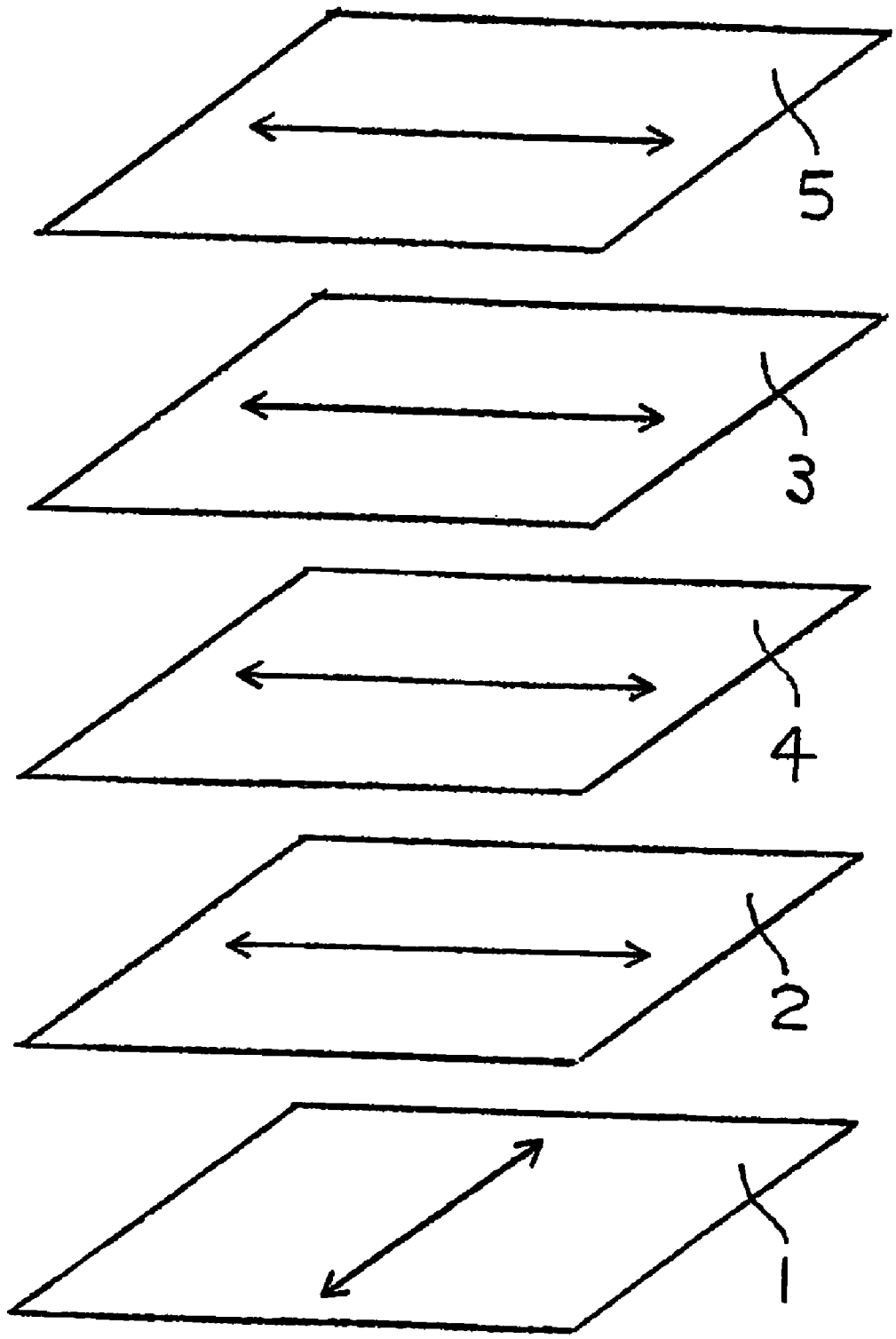
FIG. 6 shows a diagram exhibiting an embodiment having arrangement II-2 in the liquid crystal display device of the present invention.

FIG. 6 shows a diagram exhibiting the fourth embodiment of the preferable arrangement (referred to as arrangement II-2, hereinafter) of the liquid crystal display device of the present invention. In arrangement II-2, the absorption axis of the polarizer at the output side and the in-plane slow axis of the liquid crystal of the liquid crystal cell under application of no voltage are disposed at relative positions parallel to each other, and the absorption axis of the polarizer at the output side and the in-plane slow axis of the liquid crystal of the liquid crystal cell under application of no voltage are disposed at relative positions parallel to each other. The in-plane slow axes of optically anisotropic member (A) and optically anisotropic member (B) are disposed at relative positions approximately parallel to each other. It is preferable that the in-plane slow axis of optically anisotropic member (B) and the in-plane slow axis of the liquid crystal of the liquid crystal cell under application of no voltage are disposed at relative positions approximately parallel to each other, and optically anisotropic member (B) is disposed at a position closer to the liquid cell than optically anisotropic member (A). Due to the above relative positions of optically anisotropic member (A), optically anisotropic member (B), the liquid crystal cell and the two polarizers, the minimum value of the contrast can be made 20 or greater at polar angles of 0 to 80°.

In arrangement II-2, the preferable combination of the in-plane retardation $R_e$(A) (the unit: nm) and the retardation in the direction of the thickness $R_{th}$(A) (the unit: nm) of optically anisotropic member (A) and the in-plane retardation $R_e$(B) (the unit: nm) and the retardation in the direction of the thickness $R_{th}$(B) (the unit: nm) of optically anisotropic member (B) is: 10≦$R_e$(A)≦−1,000, −500≦$R_{th}$(A)≦−5, 100≦$R_e$(B)≦450 and 50≦$R_{th}$(B)≦225. The most preferable combination is: 420≦$R_e$(A)≦460, −240≦$R_{th}$(A)≦−200, 170≦$R_e$(B)≦210 and 75≦$R_{th}$(B)≦115.

In the fifth and sixth embodiments of the preferable arrangement, one of optically anisotropic member (A) and optically anisotropic member (B) is disposed between the polarizer at the incident side and the liquid crystal cell and the other is disposed between the polarizer at the output side and the liquid crystal cell.

(III-1) The Fifth Embodiment of the Preferable Arrangement

Figure 7:
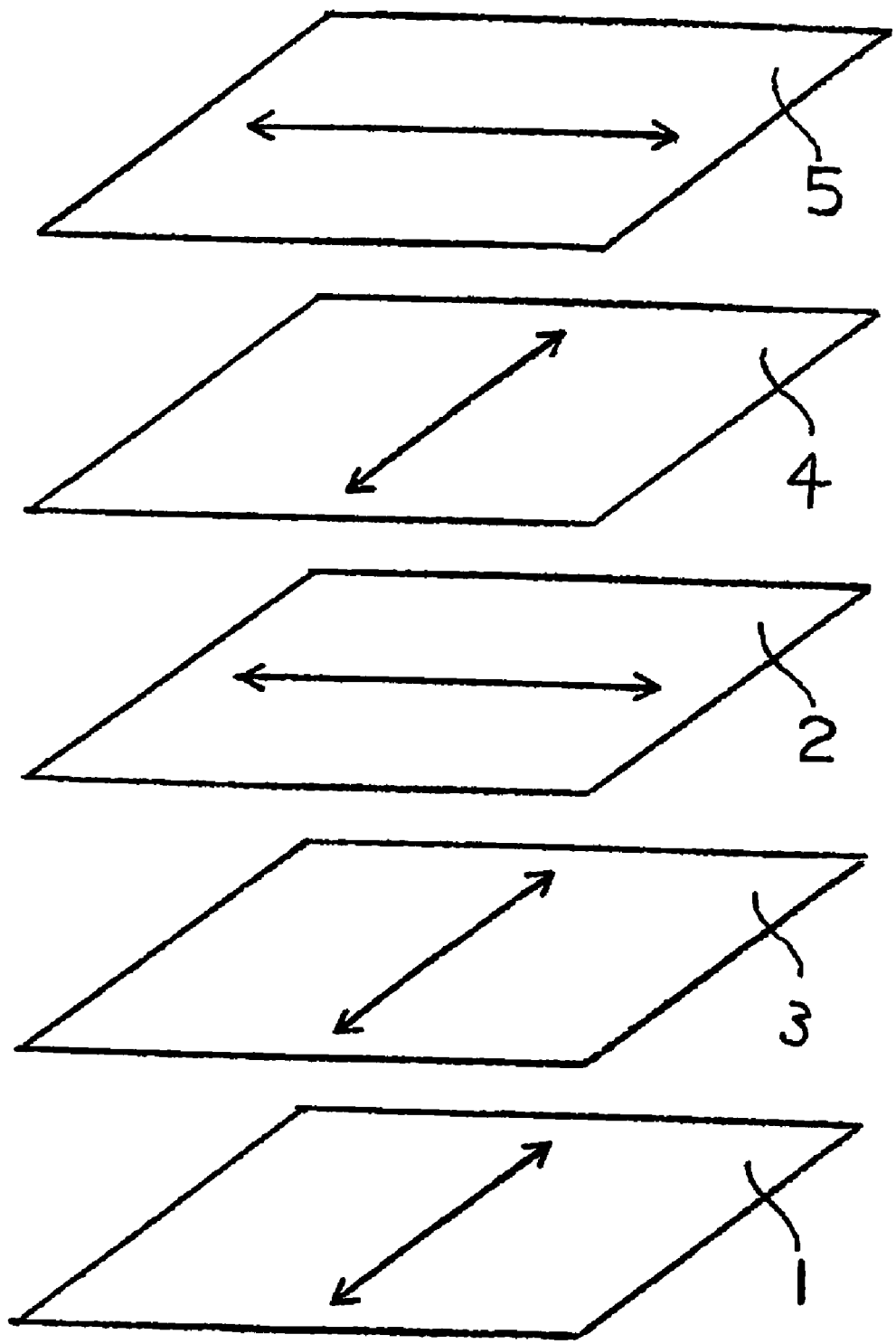
FIG. 7 shows a diagram exhibiting an embodiment having arrangement III-1 in the liquid crystal display device of the present invention.

FIG. 7 shows a diagram exhibiting the fifth embodiment of the preferable arrangement (referred to as arrangement III-1, hereinafter) of the liquid crystal display device of the present invention. In arrangement III-1, the absorption axis of the polarizer at the output side and the in-plane slow axis of the liquid crystal of the liquid crystal cell under application of no voltage are disposed at relative positions parallel to each other. The in-plane slow axes of optically anisotropic member (A) and optically anisotropic member (B) are disposed at relative positions approximately parallel to each other. It is preferable that the in-plane slow axis of optically anisotropic member (A) and the in-plane slow axis of the liquid crystal of the liquid crystal cell under application of no voltage are disposed at relative positions approximately perpendicular to each other, optically anisotropic member (A) is disposed between the liquid crystal cell and the polarizer at the incident side, and optically anisotropic member (B) is disposed between the liquid crystal cell and the polarizer at the output side. Due to the above relative positions of optically anisotropic member (A), optically anisotropic member (B), the liquid crystal cell and the two polarizers, the minimum value of the contrast can be made 30 or greater at polar angles of 0 to 80°.

In arrangement III-1, the preferable combination of the in-plane retardation $R_e$(A) (the unit: nm) and the retardation in the direction of the thickness $R_{th}$(A) (the unit: nm) of optically anisotropic member (A) and the in-plane retardation $R_e$(B) (the unit: nm) and the retardation in the direction of the thickness $R_{th}$(B) (the unit: nm) of optically anisotropic member (B) is: 10≦$R_e$(A)≦720, −360≦$R_{th}$(A)≦−5, 10≦$R_e$(B)≦1,000 and −500≦$R_{th}$(B)≦−5. The more preferable combinations are: (1) 170≦$R_e$(A)≦230, −115≦$R_{th}$(A)≦−85, 400≦$R_e$(B)≦460 and 200≦$R_{th}$(B)≦230; and (2) 270≦$R_e$(A)≦440, −220≦$R_{th}$(A)≦−135, 20≦$R_e$(B)≦190 and 10≦$R_{th}$(B)≦95. The still more preferable combination is: 310≦$R_e$(B)≦410, −205≦$R_{th}$(A)≦−155, 50≦$R_e$(B)≦140 and $25 \leq R_{th}(B) \leq 70$. The most preferable combination is: $340 \leq R_e(A) \leq 380$, $-200 \leq R_{th}(B) \leq -160$, $70 \leq R_e(B) \leq 110$ and $25 \leq R_{th}(B) \leq 65$.

(III-2) The Sixth Embodiment of the Preferable Arrangement

Figure 8:
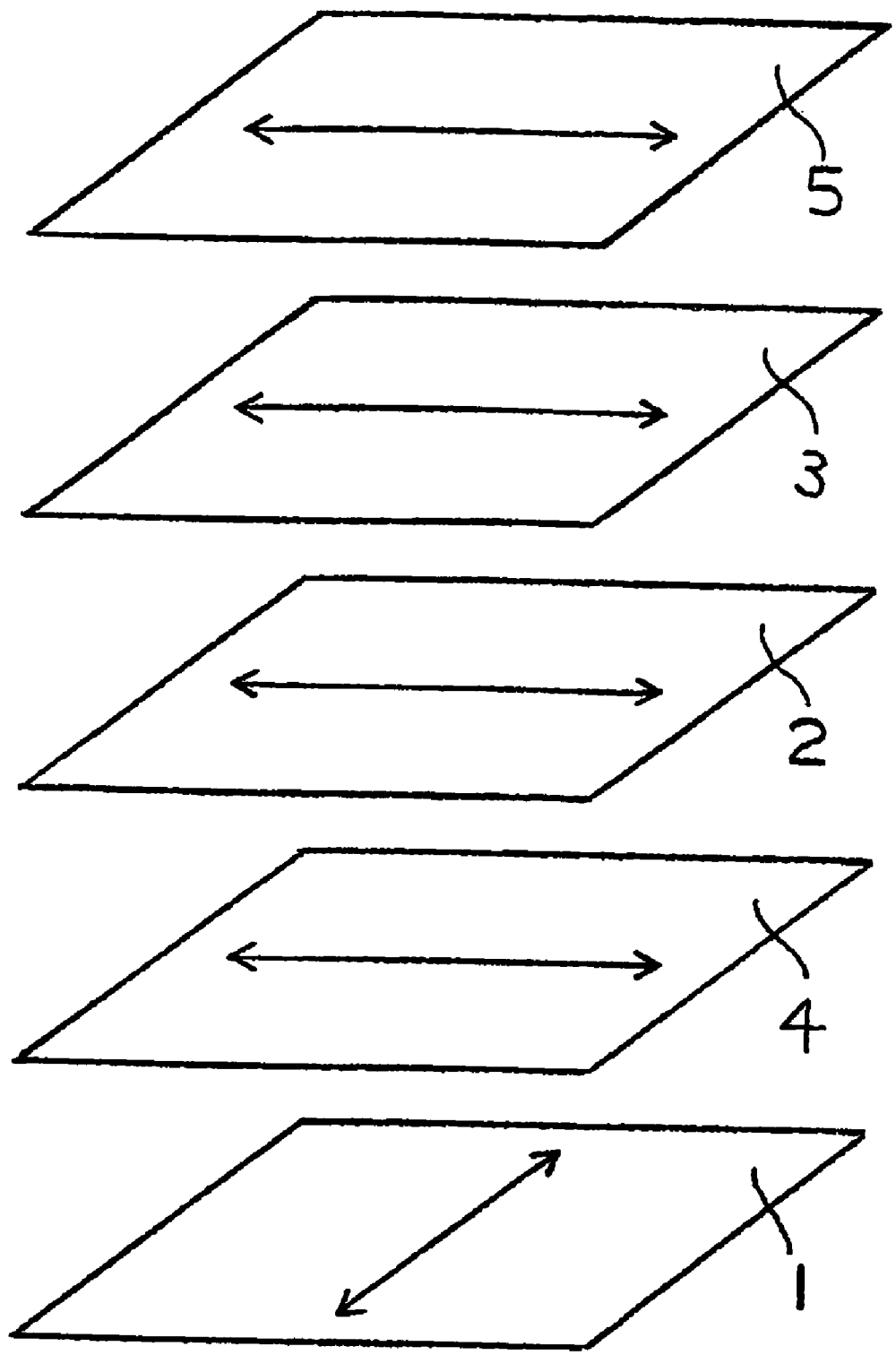
FIG. 8 shows a diagram exhibiting an embodiment having arrangement III-2 in the liquid crystal display device of the present invention.

FIG. 8 shows a diagram exhibiting the sixth embodiment of the preferable arrangement (referred to as arrangement III-2, hereinafter) of the liquid crystal display device of the present invention. In arrangement III-2, the absorption axis of the polarizer at the output side and the in-plane slow axis of the liquid crystal of the liquid crystal cell under application of no voltage are disposed at relative positions parallel to each other. The in-plane slow axes of optically anisotropic member (A) and optically anisotropic member (B) are disposed at relative positions approximately parallel to each other. It is preferable that the in-plane slow axis of optically anisotropic member (A) and the in-plane slow axis of the liquid crystal of the liquid crystal cell under application of no voltage are disposed at relative positions approximately parallel to each other, optically anisotropic member (B) is disposed between the liquid crystal cell and the polarizer at the incident side, and optically anisotropic member (A) is disposed between the liquid crystal cell and the polarizer at the output side. Due to the above relative positions of optically anisotropic member (A), optically anisotropic member (B), the liquid crystal cell and the two polarizers, the minimum value of the contrast can be made 20 or greater at polar angles of 0 to 80°.

In arrangement III-1, the preferable combination of the in-plane retardation $R_e(A)$ (the unit: nm) and the retardation in the direction of the thickness $R_{th}(A)$ (the unit: nm) of optically anisotropic member (A) and the in-plane retardation $R_e(B)$ (the unit: nm) and the retardation in the direction of the thickness $R_{th}(B)$ (the unit: nm) of optically anisotropic member (B) is: $10 \leq R_e(A) \leq 1,000$, $-500 \leq R_{th}(A) \leq -5$, $120 \leq R_e(B) \leq 440$ and $60 \leq R_{th}(B) \leq 220$. The most preferable combination is: $40 \leq R_e(A) \leq 80$, $-50 \leq R_{th}(A) \leq -10$, $340 \leq R_e(B) \leq 380$ and $160 \leq R_{th}(B) \leq 200$.

In the liquid crystal display device of the present invention, suitable members such as prism array sheets, lens array sheets, light diffusion plates, back lights and films for increasing luminance may be disposed at suitable positions as one or more layers.

In the liquid crystal display device of the present invention, a cold cathode tube, a horizontal mercury lamp, a light emitting diode or an electroluminescence device may be used as the back light.

EXAMPLES

The present invention will be described more specifically with reference to examples in the following. However, the present invention is not limited to the examples.

In Examples and Comparative Example, a polarizer plate which was a laminate of a polarizer and a protective film for the polarizer [manufactured by SANRITZ Co., Ltd.; HLC 2-5618] was used. As the liquid crystal cell, a liquid crystal cell of the in-plane switching mode having a thickness of 2.74 μm, a positive dielectric anisotropy, a birefringence of $\Delta n = 0.09884$ at a wavelength of 550 nm and a pretilt angle of 0° was used.

In Examples and Comparative Example, measurements and evaluations were conducted in accordance with the following methods.

(1) Thickness

After a laminate for optical applications was embedded into an epoxy resin, the laminate was sliced into pieces having a thickness of 0.05 μm using a microtome [manufactured by YAMATO KOKI KOGYO Co., Ltd.; RUB-2100], and the thickness of each piece was measured by observing the section using a transmission electron microscope.

(2) Glass Transition Temperature

The glass transition temperature was measured in accordance with the method of differential scanning calorimetry (DSC) described in Japanese Industrial Standard K 7121.

(3) Refractive Indices ($n_x$, $n_y$ and $n_z$), Retardations (in-Plane Retardation $R_e$ and Retardation in the Direction of Thickness $R_{th}$) and Dispersion of the in-Plane Retardations of Optically Anisotropic Member (A) and Optically Anisotropic Member (B)

For the measurement of the refractive indices of optically anisotropic member (A) and optically anisotropic member (B), the direction of the in-plane slow axis of the anisotropic member with respect to light having a wavelength of 550 nm was measured using an automatic birefringence meter [manufactured by OJI KEISOKUKIKI Co., Ltd.; KOBRA-21]. Then, the refractive index of the anisotropic member in the direction of the slow axis was measured as $n_x$, the refractive index in the direction in-plane and perpendicular to the direction of the slow axis was measured as $n_y$, and the refractive index in the direction of the thickness of the anisotropic member was measured as $n_z$. When the optically anisotropic member was a laminate, $n_x$, $n_y$ and $n_z$ were calculated in accordance with the following equations after the refractive indices ($n_{xi}$, $n_{yi}$ and $n_{zi}$) of each layer had been measured. In each layer of the laminate, the refractive index in the direction parallel to the slow axis of the optically anisotropic substance is represented by $n_{xi}$, the refractive index in the direction in-plane and perpendicular to the slow axis is represented by $n_{yi}$, and the refractive index in the direction of the thickness is represented by $n_{zi}$.

$$n_x = [\Sigma(n_{xi} \times d_i)] / [(\Sigma d_i)]; \; n_y = [\Sigma(n_{yi} \times d_i)] / [(\Sigma d_i)]; \; n_z = [\Sigma(n_{zi} \times d_i)] / [(\Sigma d_i)]$$

wherein $\Sigma$ means the total sum, each layer in the anisotropic member is indicated by i (i=1, 2 ... ), and the thickness of each layer is represented by $d_{i1}$, $d_{i2}$ ... .

The retardations $R_e$ and $R_{th}$ were measured with respect to light having a wavelength of 550 nm using the above automatic birefringence meter.

As for the dispersion of the in-plane retardation, the in-plane retardation was measured at 30 positions arbitrarily selected over the entire surface of the anisotropic member, and the arithmetic average of the obtained values was used as the value of the in-plane retardation. The difference between the maximum value and the minimum value among the values obtained by the measurement was used as the dispersion of the in-plane retardation.

(4) Content of Residual Volatile Components

An optically anisotropic member in an amount of 200 g was placed into a tube having an inner diameter of 4 mm used as the container of the sample, which had been treated in advance to completely remove moisture and organic substances adsorbed on the surface. Then, the container was heated at a temperature of 100° C. for 60 minutes, and the gas discharged from the container was continuously trapped. The trapped gas was analyzed by a thermal desorption gas chromatography mass analyzer (TDS-GC-MS), and the total of the contents of components having a molecular weight of 200 or smaller among the components of the gas was obtained and used as the content of residual volatile components.

(5) Refractive Indices of a Hard Coat Layer and a Low Refractive Index Layer

The measurement was conducted at a wavelength of 245 to 1,000 nm and incident angles of 55°, 60° and 65° using a high speed spectroscopic elipsometer [manufactured by J. A. WOOLAM Company; M-2000U], and the refractive indices were obtained by calculation based on the values obtained by the measurement.

(6) Reflectance

The reflection spectrum was measured at an incident angle of 5° using a spectrophotometer [manufactured by NIPPON BUNKO Co., Ltd.; "Ultraviolet, visible and near-infrared spectrophotometer V-570"], and the reflectance at a wavelength of 550 nm and the maximum value of the reflectance at wavelengths in the range of 430 to 700 nm were obtained.

(7) Angle of Field of a Liquid Crystal Display Device

Optically anisotropic member (A) and optically anisotropic member (B) were disposed in a liquid crystal display device of the in-plane switching (IPS) mode, and the display characteristic was examined by visual observation directly in front of the display and in oblique directions at polar angles of 800 and smaller.

(8) Nonuniformity of Luminance

Optically anisotropic member (A) and optically anisotropic member (B) were disposed in a liquid crystal display device of the in-plane switching (IPS) mode. The background of the display was adjusted to the dark display, and the presence or the absence of nonuniformity of luminance (white spots) was examined by visual observation in a dark room directly in front of the display and in upward, downward, rightward and leftward oblique directions each at a polar angle of 40°.

(9) Scratch Resistance

Steel wool #0000 was pressed to a polarizer plate at the side having laminated layers of a hard coat layer and a low refractive index layer. After the steel wool was moved reciprocally 10 times under a load of 0.05 MPa, the condition of the surface of the polarizer plate after the 10 reciprocal movements was visually observed.

Preparation Example 1

Preparation of a Film of Optically Anisotropic Member (A1)

An unstretched laminate which comprised layer [1] comprising a norbornene-based polymer [manufacture by NIPPON ZEON Co., Ltd.; ZEONOR 1020; the glass transition temperature: 105° C.], layer [2] comprising a styrene-maleic anhydride copolymer [the glass transition temperature: 130° C.; the content of oligomer components: 3% by weight] and layer [3] comprising a modified ethylene-vinyl acetate copolymer [the Vicat softening point: 80° C.] and had a structure of layer [1] (8 μm)—layer [3] (2 μm)—layer [2] (16 μm)—layer [3] (2 μm)—layer [1] (8 μm) was obtained in accordance with the coextrusion molding. The unstretched laminate was uniaxially stretched in the longitudinal direction by a nip roll at a temperature of 134° C. at a stretching speed of 114%/min to a stretching ratio of 1.4, and a long sheet of a film having the slow axis in the transverse direction of the film, optically anisotropic member (A1), was obtained.

Optically anisotropic member (A1) had refractive indices of $n_{xA}$: 1.57130, $n_{yA}$: 1.57012, $n_{zA}$: 1.57130, an in-plane retardation $R_e$ of 110 nm, a retardation in the direction of the thickness $R_{th}$ of −55 nm, and a content of residual volatile components of 0.01% or smaller.

Preparation Example 2

Preparation of a Film of Optically Anisotropic Member (B1)

Unstretched single layer film (b1) comprising a norbornene-based polymer [manufacture by NIPPON ZEON Co., Ltd.; ZEONOR 1420; the glass transition temperature: 136° C.] was obtained in accordance with the extrusion molding. Unstretched single layer film (b1) was uniaxially stretched in the transverse direction by a tenter at a temperature of 140° C. at a stretching speed of 92%/min to a stretching ratio of 1.3, and a long sheet of a film having the slow axis in the transverse direction of the film, optically anisotropic member (B1), was obtained.

Optically anisotropic member (B1) had refractive indices of $n_{xB}$:1.53109, $n_{yB}$:1.53011, $n_{zB}$:1.52962, an in-plane retardation $R_e$ of 60 nm, a retardation in the direction of the thickness $R_{th}$ of 60 nm, and a content of residual volatile components of 0.01% or smaller.

Preparation Example I

Preparation of a Hard Coating Agent

To 100 parts by weight of a modified alcohol sol of antimony pentaoxide [the concentration of solid components: 30% by weight; manufactured by SHOKUBAI KASEI Co., Ltd.], 10 parts by weight of a urethane acrylate of the ultraviolet light curing type [the trade name: SHIKO UV7000B; manufactured by NIPPON GOSEI KAGAKU Co., Ltd.] and 0.4 parts by weight of a photopolymerization initiator [the trade name: IRGACURE 184; manufactured by CIBA GEIGY Company] were mixed, and a hard coating agent of the ultraviolet light curing type was obtained.

Preparation Example II

Preparation of a Coating Fluid for a Low Refractive Index Layer

To 208 parts by weight of tetraethoxysilane, 356 parts by weight of methanol was added. Then, 18 parts by weight of water and 18 parts by weight of 0.01N hydrochloric acid were mixed with the resultant solution, and the obtained mixture was mixed well by a disper. The mixed solution was stirred for 2 hours in a vessel kept at 25° C., and a tetrafunctional silicone resin having a weight-average molecular weight of 850 was obtained. To the tetrafunctional silicone resin, a dispersion sol of hollow silica in isopropanol (IPA) [the content of solid components: 20% by mass; the average diameter of primary particles: 35 nm: the thickness of the outer shell: about 8 nm; manufactured by SHOKUBAI KASEI KOGYO Co., Ltd.] as the component of fine particles of hollow silica was added in an amount such that the ratio of the amounts by mass of solid components in the hollow silica fine particles to those in the tetrafunctional silicone resin (calculated as condensed compounds) was 85/25. The resultant mixture was diluted with methanol so that the content of the entire solid components was 10% by mass, and a coating fluid for a low refractive index layer was obtained.

Preparation Example III

Preparation of a Hard Coat Layer

One face of a long sheet of a polarizer plate [manufactured by SANRITZ Company; HLC2-5618S] was treated by corona discharge for 3 seconds using a high frequency oscillator [CORONA GENERATOR HV05-2; manufactured by TAMTEC Company], and the surface was modified so that the surface tension was 0.072 N/m. The surface modified above was continuously coated with the hard coating agent obtained in Preparation Example I using a die coater in a manner such that the thickness of the hard coat layer obtained after being cured was 5 μm. After the coating layer was dried at 80° C. for 5 minutes, the coating layer was irradiated with ultraviolet light (the accumulated amount of light: 300 mJ/cm$^2$) to cure the hard coating agent, and a long sheet of polarizer plate (C') laminated with the hard coat layer was obtained. The hard coat layer had a thickness of 5 μm, a refractive index of 1.62 and a surface roughness of 0.2 μm after being cured.

Preparation Example IV

Preparation of a Low Refractive Index Layer

The long sheet of polarizer plate (C') laminated with the hard coat layer was coated with the coating fluid for a low refractive index layer obtained in Preparation Example II as the material constituting the low refractive index layer using a wire bar coater. After the heat treatment in the air at 120° C. for 5 minutes, a long sheet of polarizer plate (C) laminated with the low refractive index layer and the hard coat layer in which the low refractive index layer had a thickness of 100 nm was obtained. The refractive index of the obtained low refractive index layer was 1.34.

Example 1

Preparation of a Liquid Crystal Display Device LCD-1

Optical element (b'1) was obtained by laminating the long sheet of optically anisotropic member (B1) obtained in Preparation Example 2 and a long sheet of a polarizer plate (manufactured by SANRITZ Company; HLC2-5618) in accordance with the roll-to-roll process. The angle between the slow axis of optically anisotropic member (B1) and the absorption axis of the polarizer plate was 900.

Optical element (a'1) was obtained by laminating the long sheet of optically anisotropic member (A1) obtained in Preparation Example 1 and optical element (b'1) obtained above in accordance with the roll-to-roll process. The angle between the slow axis of optically anisotropic member (A1) and the absorption axis of optical element (b'1) obtained above was 90°. A plate obtained by cutting out of optical element (a'1) obtained above was used as polarizer plate of the incident side (A'1).

A polarizer plate at the incident side in a commercial liquid crystal display device of the in-plane switching (IPS) mode was replaced with polarizer plate of the incident side (A'1). The polarizer plate at the output side in the liquid crystal display device was replaced with a plate obtained by cutting out of the long sheet of polarizer plate (C) laminated with the low refractive index layer and the hard coat layer which was obtained Preparation Example IV. The members of the liquid crystal display device were arranged in a manner such that the absorption axis of polarizer plate of the output side and the in-plane slow axis of the liquid crystal cell under application of no voltage were parallel to each other, and the absorption axis of polarizer plate of the incident side (A'1) and the in-plane slow axis of the liquid crystal cell under application of no voltage were perpendicular to each other, and a liquid crystal display device having the structure shown in FIG. 3, LCD-1, was prepared. The obtained device had a structure in which the members were disposed in the following order from the side of vision of the liquid crystal display device: the low refractive index layer, the hard coat layer, the polarizer plate, the liquid crystal cell, the film of optically anisotropic member (A1) obtained in Preparation Example 1, the film of optically anisotropic member (B1) obtained in Preparation Example 2, and the polarizer plate.

When the property of display of the obtained liquid crystal display device LCD-1 was evaluated by visual observation, it was found that the images of display were excellent and uniform in the observations directly in front of the display and in any oblique directions at angles of 80° and smaller as the polar angle. Nonuniformity of the luminance was not found in the observations directly in front of the display or in any upward, downward, rightward or leftward oblique direction at any angle of 40° or smaller. No reflection of light from the outside was found. The reflectance at the wavelength of 550 nm was 0.53%, and the maximum value of the reflectance at wavelengths in the range of 430 to 700 nm was 1.0%. No scratches were found in the test of scratch resistance.

Preparation Example 3

Preparation of a Film of Optically Anisotropic Member (A2)

An unstretched laminate which comprised layer [1] comprising a norbornene-based polymer [manufacture by NIPPON ZEON Co., Ltd.; ZEONOR 1020; the glass transition temperature: 105° C.], layer [2] comprising a styrene-maleic anhydride copolymer [the glass transition temperature: 130° C.; the content of oligomer components: 3% by weight] and layer [3] comprising a modified ethylene-vinyl acetate copolymer [the Vicat softening point: 80° C.] and had a structure of layer [1] (8 μm)—layer [3] (2 μm)—layer [2] (16 μm)—layer [3] (2 μm)—layer [1] (8 μm) was obtained in accordance with the coextrusion molding. The unstretched laminate was uniaxially stretched in the transverse direction by a tenter at a temperature of 132° C. at a stretching speed of 104%/min to a stretching ratio of 1.35, and a long sheet of a film having the slow axis in the longitudinal direction of the film, optically anisotropic member (A2), was obtained.

Optically anisotropic member (A2) had refractive indices of $n_{xA}$:1.53129, $n_{yA}$:1.53011, $n_{zA}$:1.53160, an in-plane retardation $R_e$ of 70 nm, a retardation in the direction of the thickness $R_{th}$ of −52.5 nm, and a content of residual volatile components of 0.01% or smaller.

Preparation Example 4

Preparation of a Film of Optically Anisotropic Member (B2)

Unstretched single layer film (b2) comprising a norbornene-based polymer [manufacture by NIPPON ZEON Co., Ltd.; ZEONOR 1420; the glass transition temperature: 136° C.] was obtained in accordance with the extrusion molding. Unstretched single layer film (b2) was uniaxially stretched in the longitudinal direction by a nip roll at a temperature of 134° C. at a stretching speed of 104%/min to a stretching ratio of 1.35, and a long sheet of a film having the slow axis in the longitudinal direction of the film, optically anisotropic member (B2), was obtained.

Optically anisotropic member (B2) had refractive indices of $n_{xB}$: 1.53156, $n_{yB}$:1.53011, $n_{zB}$:1.53011, an in-plane retardation $R_e$ of 100 nm, a retardation in the direction of the thickness $R_{th}$ of 50 nm, and a content of residual volatile components of 0.01% or smaller.

Example 2

Preparation of a Liquid Crystal Display Device LCD-2

Optical element (a'2) was obtained by laminating the long sheet of optically anisotropic member (A2) obtained in Preparation Example 3 and a long sheet of a polarizer plate (manufactured by SANRITZ Company; HLC2-5618) in accordance with the roll-to-roll process. The angle between the slow axis of optically anisotropic member (A2) and the absorption axis of the polarizer plate was 0°.

Optical element (b'2) was obtained by laminating the long sheet of optically anisotropic member (B2) obtained in Preparation Example 4 and optical element (a'2) obtained above in accordance with the roll-to-roll process. The angle between the slow axis of optically anisotropic member (B2) and the absorption axis of optical element (a'2) obtained above was 0°. A plate obtained by cutting out of optical element (b'2) obtained above was used as polarizer plate of the incident side (B'1).

A polarizer plate at the incident side in a commercial liquid crystal display device of the in-plane switching (IPS) mode was replaced with polarizer plate of the incident side (B'1). The polarizer plate at the output side in the liquid crystal display device was replaced with a plate obtained by cutting out of the long sheet of polarizer plate (C) laminated with the low refractive index layer and the hard coat layer which was obtained Preparation Example IV. The members of the liquid crystal display device were arranged in a manner such that the absorption axis of polarizer plate of the output side and the in-plane slow axis of the liquid crystal cell under application of no voltage were parallel to each other, and the absorption axis of polarizer plate of the incident side (A'2) and the in-plane slow axis of the liquid crystal cell under application of no voltage were perpendicular to each other, and a liquid crystal display device having the structure shown in FIG. 4, LCD-2, was prepared. The obtained device had a structure in which the members were disposed in the following order from the side of vision of the liquid crystal display device: the low refractive index layer, the hard coat layer, the polarizer plate, the liquid crystal cell, the film of optically anisotropic member (B2) obtained in Preparation Example 4, the film of optically anisotropic member (A2) obtained in Preparation Example 3, and the polarizer plate.

When the property of display of the obtained liquid crystal display device LCD-2 was evaluated by visual observation, it was found that the images of display were excellent and uniform in the observations directly in front of the display and in any oblique directions at angles of 80° and smaller as the polar angle. Nonuniformity of the luminance was not found in the observations directly in front of the display or in any upward, downward, rightward or leftward oblique direction at any angle of 40° or smaller. No reflection of light from the outside was found. The reflectance at the wavelength of 550 nm was 0.53%, and the maximum value of the reflectance at wavelengths in the range of 430 to 700 nm was 1.0%. No scratches were found in the test of scratch resistance.

Preparation Example 5

Preparation of a Film of Optically Anisotropic Member (A3)

A long sheet of unstretched film (a3) comprising a norbornene-based polymer [manufactured by NIPPON ZEON Co., Ltd.; ZEONOR 1420R; the glass transition temperature: 136° C.] and having a thickness of 100 µm was obtained in accordance with the extrusion molding. Unstretched film (a3) obtained above had a content of residual volatile components of 0.01% or smaller.

The above unstretched film (a3) was coated with a solution containing 8% by weight of the lyotropic liquid crystal expressed by formula (3) shown above and 92% by weight of water using a die coater under shearing force in the direction parallel to the transverse direction of the film without using a film for orientation. The coated film was left standing under an atmosphere heated at 118° C. (after being purged with argon) to remove water, and a film of optically anisotropic member (A3) was obtained. The lyotropic liquid crystal molecules were arranged in the homogeneous orientation in a manner such that the slow axis was oriented in the longitudinal direction of the transparent polymer film.

Optically anisotropic member (A3) obtained above had refractive indices of $n_{xA}$:1.63387, $n_{yA}$:1.54203 and $n_{xA}$:1.63387, an in-plane retardation $R_e$ of 90 nm, and a retardation in the direction of the thickness $R_{th}$ of −45 nm.

Preparation Example 6

Preparation of a Film of Optically Anisotropic Member (B3)

Unstretched single layer film (b3) comprising a norbornene-based polymer [manufacture by NIPPON ZEON Co., Ltd.; ZEONOR 1420; the glass transition temperature: 136° C.] was obtained in accordance with the extrusion molding. Unstretched single layer film (b3) was uniaxially stretched in the longitudinal direction by a nip roll at a temperature of 133° C. at a stretching speed of 92%/min to a stretching ratio of 1.3, and a long sheet of a film having the slow axis in the longitudinal direction of the film, optically anisotropic member (B3), was obtained.

Optically anisotropic member (B3) had refractive indices of $n_{xB}$: 1.53125, $n_{yB}$:1.53011, $n_{zB}$:1.53011, an in-plane retardation $R_e$ of 90 nm, a retardation in the direction of the thickness $R_{th}$ of 45 nm, and a content of residual volatile components of 0.01% or smaller.

Example 3

Preparation of a Liquid Crystal Display Device LCD-3

Optical element (a'3) was obtained by laminating the long sheet of optically anisotropic member (A3) obtained in Preparation Example 5 and a long sheet of a polarizer plate (manufactured by SANRITZ Company; HLC2-5618) in accordance with the roll-to-roll process in a manner such that the side of the layer of the lyotropic liquid crystal in optically anisotropic member (A3) was placed towards the polarizing plate. The angle between the slow axis of optically anisotropic member (A3) and the absorption axis of the polarizer plate was 0°.

Optical element (b'3) was obtained by laminating the long sheet of optically anisotropic member (B3) obtained in Preparation Example 6 and optical element (a'3) obtained above in accordance with the roll-to-roll process. The angle between the slow axis of optically anisotropic member (B3) and the absorption axis of optical element (a'3) obtained above was 0°. A plate obtained by cutting out of optical element (b'3) obtained above was used as polarizer plate of the incident side (B'3).

A polarizer plate at the incident side in a commercial liquid crystal display device of the in-plane switching (IPS) mode was replaced with polarizer plate of the incident side (B'3). The polarizer plate at the output side in the liquid crystal display device was replaced with a plate obtained by cutting out of the long sheet of polarizer plate (C) laminated with the low refractive index layer and the hard coat layer which was obtained Preparation Example IV. The members of the liquid crystal display device were arranged in a manner such that the absorption axis of the polarizer plate of the output side and the in-plane slow axis of the liquid crystal cell under application of no voltage were parallel to each other, and the absorption axis of polarizer plate of the incident side (B'3) and the in-plane slow axis of the liquid crystal cell under application of no voltage were perpendicular to each other, and a liquid crystal display device having the structure shown in FIG. 4, LCD-3, was prepared. The obtained device had a structure in which the members were disposed in the following order from the side of vision of the liquid crystal display device: the low refractive index layer, the hard coat layer, the polarizer plate, the liquid crystal cell, the film of optically anisotropic member (B3) obtained in Preparation Example 6, the film of optically anisotropic member (A3) obtained in Preparation Example 5, and the polarizer plate.

When the property of display of the obtained liquid crystal display device LCD-3 was evaluated by visual observation, it was found that the images of display were excellent and uniform in the observations directly in front of the display and in any oblique directions at angles of 80° and smaller as the polar angle. Nonuniformity of the luminance was not found in the observations directly in front of the display or in any upward, downward, rightward or leftward oblique direction at any angle of 40° or smaller. No reflection of light from the outside was found. The reflectance at the wavelength of 550 nm was 0.53%, and the maximum value of the reflectance at wavelengths in the range of 430 to 700 nm was 1.0%. No scratches were found in the test of scratch resistance.

Preparation Example 7

Preparation of a Film of Optically Anisotropic Member (A4)

A long sheet of unstretched film (a4) comprising a norbornene-based polymer [manufacture by NIPPON ZEON Co., Ltd.; ZEONOR 1420R; the glass transition temperature: 136° C.] and having a thickness of 100 μm was obtained in accordance with the extrusion molding. Unstretched film (a4) obtained above had a content of residual volatile components of 0.01% or smaller.

Polyvinyl alcohol expressed by the following formula (7) was dissolved into a mixed solvent of methanol and acetone (the ratio of amounts by volume: 50:50), and a 5% solution was prepared. The obtained solution was applied to film (a4) obtained above using a bar coater to form a layer having a thickness of 1 μm, and the resultant layer was dried under a stream of the warm air at 60° C. for 2 minutes. The surface of the resultant layer was subjected to the rubbing treatment, and a film for perpendicular orientation was prepared.

Modified Polyvinyl Alcohol

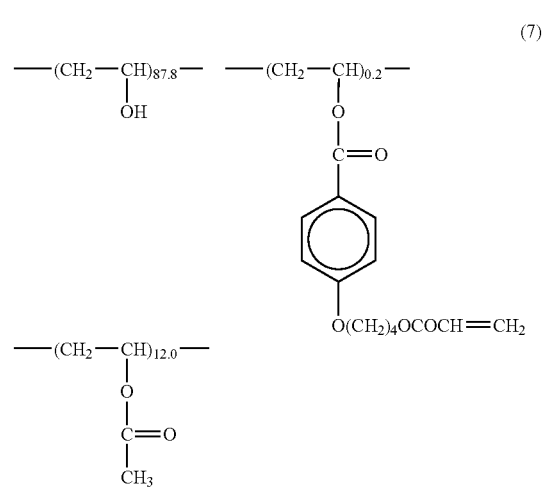

(7)

The film for perpendicular orientation prepared above was coated with a coating fluid containing 33.5% by weight of a discotic liquid crystal represented by formula (1) (i) shown above, 0.7% by weight of cellulose acetate butyrate, 3.1% by weight of a modified trimethylolpropane triacrylate, 0.4% by weight of a sensitizer, 1.1% of a photopolymerization initiator and 61.2% by weight of methyl ethyl ketone to form a layer having a thickness of 3.5 μm, and the discotic liquid crystal molecules were arranged in the homogeneous orientation. Then, the coating layer was irradiated with ultraviolet light from a mercury pump at an illuminance of 500 W/cm$^2$ for 1 second to polymerize the discotic liquid crystal molecules. A film of optically anisotropic member (A4) was obtained as described above. The discotic liquid crystal molecules were arranged in the homogeneous orientation in a manner such that the slow axis was in the longitudinal direction of film (a4).

Optically anisotropic member (A4) had refractive indices of $n_{xA}$: 1.68296, $n_{yA}$:1.58010 and $n_{zA}$:1.68296, an in-plane retardation $R_e$ of 360 nm, and a retardation in the direction of the thickness $R_{th}$ of −180 nm.

Preparation Example 8

Preparation of a Film of Optically Anisotropic Member (B4)

Unstretched single layer film (b4) comprising a norbornene-based polymer [manufacture by NIPPON ZEON Co., Ltd.; ZEONOR 1600; the glass transition temperature: 163° C.] was obtained in accordance with the extrusion molding. Unstretched single layer film (b4) was uniaxially stretched in the longitudinal direction by a nip roll at a temperature of 136° C. at a stretching speed of 150%/min to a stretching ratio of 1.6, and a long sheet of a film having the slow axis in the longitudinal direction of the film, optically anisotropic member (B4), was obtained.

Optically anisotropic member (B4) had refractive indices of $n_{xB}$: 1.53117, $n_{yB}$:1.53010, $n_{zB}$:1.53010, an in-plane retardation $R_e$ of 110 nm, a retardation in the direction of the thickness $R_{th}$ of 55 nm, and a content of residual volatile components of 0.01% or smaller.

Example 4

Preparation of a Liquid Crystal Display Device LCD-4

Optical element (a'4) was obtained by laminating the long sheet of optically anisotropic member (A4) obtained in Preparation Example 7 and the long sheet of optically anisotropic member (B4) obtained in Preparation Example 8 in accordance with the roll-to-roll process in a manner such that the side of the layer of the discotic liquid crystal in optically anisotropic member (A4) was placed towards optically anisotropic member (B4). The angle between the slow axis of optically anisotropic member (A4) and the slow axis of optically anisotropic member (B4) was 0°.

Optical element (a'4') was obtained by laminating a small film having a length of 40 cm and a width of 30 cm which was cut out of optically anisotropic member (a'4) (in a manner such that the transverse direction of optically anisotropic member (A4) was in the longitudinal direction of the small film) and the long sheet of polarizer plate (C) laminated with the low refractive index and the hard coat layer which was obtained in Preparation Example IV in a manner such that the longitudinal direction of the small film was parallel to the longitudinal direction of the long sheet and optically anisotropic member (B4) and polarizer plate (C) contact each other. The angle between the slow axis of optically anisotropic member (A4) and the absorption axis of the polarizer plate was 90°. A plate obtained by cutting out of optical element (a'4') obtained above was used as polarizer plate at the output side (A'4).

A polarizer plate at the output side in a commercial liquid crystal display device of the in-plane switching (IPS) mode was replaced with polarizer plate of the output side (A'4). The members of the liquid crystal display device were arranged in a manner such that the absorption axis of polarizer plate of the output side and the in-plane slow axis of the liquid crystal cell under application of no voltage were parallel to each other, and the absorption axis of polarizer plate of the incident side (A'4) and the in-plane slow axis of the liquid crystal cell under application of no voltage were perpendicular to each other, and a liquid crystal display device having the structure shown in FIG. 5, LCD-4, was prepared. The obtained device had a structure in which the members were disposed in the following order from the side of vision of the liquid crystal display device: the low refractive index layer, the hard coat layer, the polarizer plate, the film of optically anisotropic member (B4) obtained in Preparation Example 8, the film of optically anisotropic member A4) obtained in Preparation Example 7, the liquid crystal cell and the polarizer plate.

When the property of display of the obtained liquid crystal display device LCD-4 was evaluated by visual observation, it was found that the images of display were excellent and uniform in the observations directly in front of the display and in any oblique directions at angles of 80° and smaller as the polar angle. Nonuniformity of the luminance was not found in the observations directly in front of the display or in any upward, downward, rightward or leftward oblique direction at any angle of 40° or smaller. No reflection of light from the outside was found. The reflectance at the wavelength of 550 nm was 0.53%, and the maximum value of the reflectance at wavelengths in the range of 430 to 700 nm was 1.0%. No scratches were found in the test of scratch resistance.

Preparation Example 9

Preparation of a Film of Optically Anisotropic Member (A5)

A long sheet of unstretched film (a5) comprising a norbornene-based polymer [manufacture by NIPPON ZEON Co., Ltd.; ZEONOR 1420R; the glass transition temperature: 136° C.] and having a thickness of 100 μm was obtained in accordance with the extrusion molding. Unstretched film (a5) obtained above had a content of residual volatile components of 0.01% or smaller.

Polyvinyl alcohol expressed by the following formula (7) was dissolved into a mixed solvent of methanol and acetone (the ratio of amounts by volume: 50:50), and a 5% solution was prepared. The obtained solution was applied to film (a5) obtained above using a bar coater to form a layer having a thickness of 1 μm, and the resultant layer was dried under a stream of the warm air at 60° C. for 2 minutes. The surface of the resultant layer was subjected to the rubbing treatment, and a film for perpendicular orientation was prepared.

The film for perpendicular orientation prepared above was coated with a coating fluid containing 33.5% by weight of a discotic liquid crystal represented by formula (1) (ii) shown above, 0.7% by weight of cellulose acetate butyrate, 3.1% by weight of a modified trimethylolpropane triacrylate, 0.4% by weight of a sensitizer, 1.1% by weight of a photopolymerization initiator and 61.2% by weight of methyl ethyl ketone to form a layer having a thickness of 4.1 μm, and the discotic liquid crystal molecules were arranged in the homogeneous orientation. Then, the coating layer was irradiated with ultraviolet light from a mercury pump at an illuminance of 500 W/cm$^2$ for 1 second to polymerize the discotic liquid crystal molecules. A film of optically anisotropic member (A5) was obtained as described above. The discotic liquid crystal molecules were arranged in the homogeneous orientation in a manner such that the slow axis was oriented in the longitudinal direction of film (a5).

Optically anisotropic member (A5) had refractive indices of $n_{xA}$: 1.68798, $n_{yA}$: 1.58066 and $n_{zA}$: 1.68798, an in-plane retardation $R_e$ of 440 nm, and a retardation in the direction of the thickness $R_{th}$ of −220 nm.

Preparation Example 10

Preparation of a Film of Optically Anisotropic Member (B5)

Unstretched single layer film (b5) comprising a norbornene-based polymer [manufacture by NIPPON ZEON Co., Ltd.; ZEONOR 1420R; the glass transition temperature: 136° C.] was obtained in accordance with the extrusion molding. Unstretched single layer film (b5) was uniaxially stretched in the longitudinal direction by a nip roll at a temperature of 138° C. at a stretching speed of 165%/min to a stretching ratio of 1.7, and a long sheet of a film having the slow axis in the longitudinal direction of the film, optically anisotropic member (B5), was obtained.

Optically anisotropic member (B5) had refractive indices of $n_{xB}$: 1.53219, $n_{yB}$: 1.53013, $n_{zB}$: 1.53013, an in-plane retardation $R_e$ of 190 nm, a retardation in the direction of the thickness $R_{th}$ of 95 nm, and a content of residual volatile components of 0.01% or smaller.

Example 5

Preparation of a Liquid Crystal Display Device LCD-5

Optical element (a'5) was obtained by laminating the long sheet of optically anisotropic member (A5) obtained in Preparation Example 9 and the long sheet of polarizer plate (C) laminated with the low refractive index and the hard coat layer which was obtained in Preparation Example IV in accordance with the roll-to-roll process in a manner such that the side of the layer of the discotic liquid crystal in optically anisotropic member (A5) was placed towards the polarizing plate. The angle between the slow axis of optically anisotropic member (A5) and the absorption axis of the polarizer plate was 0°.

Optical element (b'5) was obtained by laminating the long sheet of optically anisotropic member (B5) obtained in Preparation Example 10 and optical element (a'5) obtained above in accordance with the roll-to-roll process. The angle between the slow axis of optically anisotropic member (B5) and the absorption axis of optical element (a'5) was 0°. A plate obtained by cutting out of optical element (b'5) obtained above was used as polarizer plate at the output side (B'5).

A polarizer plate at the output side in a commercial liquid crystal display device of the in-plane switching (IPS) mode was replaced with polarizer plate of the output side (B'5). The members of the liquid crystal display device were arranged in a manner such that the absorption axis of polarizer plate of the output side (B'5) and the in-plane slow axis of the liquid crystal cell under application of no voltage were parallel to each other, and the absorption axis of polarizer plate of the incident side and the in-plane slow axis of the liquid crystal cell under application of no voltage were perpendicular to each other, and a liquid crystal display device having the structure shown in FIG. 6, LCD-5, was prepared. The obtained device had a structure in which the members were disposed in the following order from the side of vision of the liquid crystal display device: the low refractive index layer, the hard coat layer, the polarizer plate, the film of optically anisotropic member (A5) obtained in Preparation Example 9, the film of optically anisotropic member B5) obtained in Preparation Example 10, the liquid crystal cell and the polarizer plate.

When the property of display of the obtained liquid crystal display device LCD-5 was evaluated by visual observation, it was found that the images of display were excellent and uniform in the observations directly in front of the display and in any oblique directions at angles of 80° and smaller as the polar angle. Nonuniformity of the luminance was not found in the observations directly in front of the display or in any upward, downward, rightward or leftward oblique direction at any angle of 40° or smaller. No reflection of light from the outside was found. The reflectance at the wavelength of 550 nm was 0.53%, and the maximum value of the reflectance at wavelengths in the range of 430 to 700 nm was 1.0%. No scratches were found in the test of scratch resistance.

Preparation Example 11

Preparation of a Film of Optically Anisotropic Member (A6)

A long sheet of unstretched film (a6) comprising a norbornene-based polymer [manufacture by NIPPON ZEON Co., Ltd.; ZEONOR 1420R; the glass transition temperature: 136° C.] and having a thickness of 100 μm was obtained in accordance with the extrusion molding. Unstretched film (a6) obtained above had a content of residual volatile components of 0.01% or smaller.

A resin expressed by the formula (5) shown above was synthesized in accordance with the process disclosed in Makromol. Chem., Rapid Commun. 10, 477-483 (1989). The synthesized resin in an amount of 8 g was dissolved into 100 g of a solvent containing methanol and methylene chloride in relative amounts by weight of 2:8, and a solution of an azobenzene resin was prepared. Film (a6) obtained above was coated with the prepared solution using a bar coater to form a layer having a thickness of 4.0 μm. While the substrate was heated at 40° C., film (a6) was irradiated with linearly polarized light (light polarized in the direction parallel to the transverse direction of the film (a6)) having a illuminance of 11,000 lux obtained from a halogen lamp in the direction perpendicular to film (a6) using an iodine-based polarizer plate, and a long sheet of a film having the slow axis in the longitudinal direction of the film, optically anisotropic member (A6), was obtained.

Optically anisotropic member (A6) obtained above had refractive indices of $n_{xA}$:1.62866, $n_{yA}$:1.52580 and $n_{zA}$:1.62866, an in-plane retardation $R_e$ of 360 nm, and a retardation in the direction of the thickness $R_{th}$ of −180 nm.

Preparation Example 12

Preparation of a Film of Optically Anisotropic Member (B6)

Unstretched single layer film (b6) comprising a norbornene-based polymer [manufacture by NIPPON ZEON Co., Ltd.; ZEONOR 1420; the glass transition temperature: 136° C.] was obtained in accordance with the extrusion molding. Unstretched single layer film (b6) was uniaxially stretched in the longitudinal direction by a nip roll at a temperature of 133° C. at a stretching speed of 92%/min to a stretching ratio of 1.3, and a long sheet of a film having the slow axis in the longitudinal direction of the film, optically anisotropic member (B6), was obtained.

Optically anisotropic member (B6) had refractive indices of $n_{xB}$: 1.53091, $n_{yB}$:1.53018, $n_{zB}$:1.53018, an in-plane retardation $R_e$ of 90 nm, a retardation in the direction of the thickness $R_{th}$ of 45 nm, and a content of residual volatile components of 0.01% or smaller.

Example 6

Preparation of a Liquid Crystal Display Device LCD-6

Optical element (b'6) was obtained by laminating a small film having a length of 40 cm and a width of 30 cm which was cut out of optically anisotropic member (B6) obtained in Preparation Example 12 (in a manner such that the transverse direction of optically anisotropic layer (B6) was in the longitudinal direction of the small film) and the long sheet of polarizer plate (C) laminated with the low refractive index and the hard coat layer which was obtained in Preparation Example IV in accordance with the roll-to-roll process in a manner such that the longitudinal direction of the small film and the longitudinal direction of the long sheet of polarizer plate (C) were parallel to each other. The angle between the slow axis of optically anisotropic member (B6) and the absorption axis of the polarizer plate was 90°. A plate obtained by cutting out of optical element (b'6) obtained above was used as polarizer plate at the output side (B'6).

Optical element (a'6) was obtained by laminating the long sheet of optically anisotropic member (A6) obtained in Preparation Example 11 and a long sheet of a polarizer plate [manufactured by SANRITZ Company; HLC2-5618] in accordance with the roll-to roll process in a manner such that the side of unstretched film (a6) of optically anisotropic member (A6) was placed at the side of the polarizer plate. The angle between the slow axis of optically anisotropic member (A6) and the absorption axis of the polarizer plate was 0°. A plate obtained by cutting out of optical element (a'6) obtained above was used as polarizer plate at the incident side (A'6).

Polarizer plates at the output side and at the incident side in a commercial liquid crystal display device of the in-plane switching (IPS) mode were replaced with polarizer plate of the output side (B'6) and polarizer plate of incident side (A'6), respectively. The members of the liquid crystal display device were arranged in a manner such that the absorption axis of polarizer plate of the output side (B'6) and the in-plane slow axis of the liquid crystal cell under application of no voltage were parallel to each other, and the absorption axis of polarizer plate of the incident side (A'6) and the in-plane slow axis of the liquid crystal cell under application of no voltage were perpendicular to each other, and a liquid crystal display device having the structure shown in FIG. 7, LCD-6, was prepared. The obtained device had a structure in which the members were disposed in the following order from the side of vision of the liquid crystal display device: the low refractive index layer, the hard coat layer, the polarizer plate, the film of optically anisotropic member (B6) obtained in Preparation Example 12, the liquid crystal cell, the film of optically anisotropic member (A6) obtained in Preparation Example 11 and the polarizer plate.

When the property of display of the obtained liquid crystal display device LCD-6 was evaluated by visual observation, it was found that the images of display were excellent and uniform in the observations directly in front of the display and in any oblique directions at angles of 80° and smaller as the polar angle. Nonuniformity of the luminance was not found in the observations directly in front of the display or in any upward, downward, rightward or leftward oblique direction at any angle of 40° or smaller. No reflection of light from the outside was found. The reflectance at the wavelength of 550 nm was 0.53%, and the maximum value of the reflectance at wavelengths in the range of 430 to 700 nm was 1.0%. No scratches were found in the test of scratch resistance.

Preparation Example 13

Preparation of a Film of Optically Anisotropic Member (A7)

A long sheet of unstretched film (a7) comprising a norbornene-based polymer [manufacture by NIPPON ZEON Co., Ltd.; ZEONOR 1600; the glass transition temperature: 163° C.] and having a thickness of 100 μm was obtained in accordance with the extrusion molding. Unstretched film (a7) obtained above had a content of residual volatile components of 0.01% or smaller.

A resin expressed by the formula (5) shown above was synthesized in accordance with the process disclosed in Makromol. Chem., Rapid Commun. 10, 477-483 (1989). The synthesized resin in an amount of 8 g was dissolved into 100 g of a solvent containing methanol and methylene chloride in relative amounts by weight of 2:8, and a solution of an azobenzene resin was prepared. Film (a7) obtained above was coated with the prepared solution using a bar coater to form a layer having a thickness of 1.1 μm. While the substrate was heated at 40° C., film (a6) was irradiated with linearly polarized light (light polarized in the direction parallel to the transverse direction of the film (a7)) having a illuminance of 9,800 lux obtained from a halogen lamp in the direction perpendicular to the film (a7) using an iodine-based polarizer plate, and a long sheet of a film having the slow axis in the longitudinal direction of the film, optically anisotropic member (A7), was obtained.

Optically anisotropic member (A7) obtained above had refractive indices of $n_{xA}$:1.62660, $n_{yA}$:1.52660 and $n_{zA}$: 1.62660, an in-plane retardation $R_e$ of 60 nm, and a retardation in the direction of the thickness $R_{th}$ of −30 nm.

Preparation Example 14

Preparation of a Film of Optically Anisotropic Member (B7)

Unstretched single layer film (b7) comprising a norbornene-based polymer [manufacture by NIPPON ZEON Co., Ltd.; ZEONOR 1420R; the glass transition temperature: 136° C.] was obtained in accordance with the extrusion molding. Unstretched single layer film (b7) was uniaxially stretched in the longitudinal direction by a nip roll at a temperature of 140° C. at a stretching speed of 190%/min to a stretching ratio of 1.9, and a long sheet of a film having the slow axis in the longitudinal direction of the film, optically anisotropic member (B7), was obtained.

Optically anisotropic member (B6) had refractive indices of $n_{xB}$: 1.53414, $n_{yB}$:1.53000, $n_{zB}$:1.53000, an in-plane retardation $R_e$ of 360 nm, a retardation in the direction of the thickness $R_{th}$ of 180 nm, and a content of residual volatile components of 0.01% or smaller.

Example 7

Preparation of a Liquid Crystal Display Device LCD-7

Optical element (a'7) was obtained by laminating a long sheet of optically anisotropic member (A7) obtained in Preparation Example 13 and the long sheet of polarizer plate (C) laminated with the low refractive index and the hard coat layer which was obtained in Preparation Example IV in accordance with the roll-to-roll process in a manner such that the side of optically unstretched film (a7) of optically anisotropic member (A7) was placed towards polarizer plate (C). The angle between the slow axis of optically anisotropic member (A7) and the absorption axis of the polarizer plate was 0°. A plate obtained by cutting out of optical element (a'7) obtained above was used as polarizer plate at the output side (A'7).

Optical element (b'7) was obtained by laminating a small film having a length of 40 cm and a width of 30 cm obtained by cutting out of the long sheet of optically anisotropic member (B7) obtained in Preparation Example 14 in a manner such that the transverse direction of optically anisotropic member (B7) was in the longitudinal direction of the small film) and a long sheet of a polarizer plate [manufactured by SANRITZ Company; HLC2-5618] in accordance with the roll-to roll process in a manner such that the longitudinal direction of the small film and the longitudinal direction of the long sheet of a polarizer plate were parallel to each other. The angle between the slow axis of optically anisotropic member (B7) and the absorption axis of the polarizer plate was 90°. A plate obtained by cutting out of optical element (b'7) obtained above was used as polarizer plate at the incident side (B'7).

Polarizer plates at the output side and at the incident side in a commercial liquid crystal display device of the in-plane switching (IPS) mode were replaced with polarizer plate of the output side (A'7) and polarizer plate of incident side (B'7), respectively. The members of the liquid crystal display device were arranged in a manner such that the absorption axis of polarizer plate of the output side (A'7) and the in-plane slow axis of the liquid crystal cell under application of no voltage were parallel to each other, and the absorption axis of polarizer plate of the incident side (B'7) and the in-plane slow axis of the liquid crystal cell under application of no voltage were perpendicular to each other, and a liquid crystal display device having the structure shown in FIG. 8, LCD-7, was prepared. The obtained device had a structure in which the members were disposed in the following order from the side of vision of the liquid crystal display device: the low refractive index layer, the hard coat layer, the polarizer plate, the film of optically anisotropic member (A7) obtained in Preparation Example 13, the liquid crystal cell, the film of optically anisotropic member (B7) obtained in Preparation Example 14 and the polarizer plate.

When the property of display of the obtained liquid crystal display device LCD-7 was evaluated by visual observation, it was found that the images of display were excellent and uniform in the observations directly in front of the display and in any oblique directions at angles of 80° and smaller as the polar angle. Nonuniformity of the luminance was not found in the observations directly in front of the display or in any upward, downward, rightward or leftward oblique direction at any angle of 40° or smaller. No reflection of light from the outside was found. The reflectance at the wavelength of 550 nm was 0.53%, and the maximum value of the reflectance at wavelengths in the range of 430 to 700 nm was 1.0%. No scratches were found in the test of scratch resistance.

Comparative Example 1

Polarizer plates in a commercial liquid crystal display device of the in-plane switching (IPS) mode were replaced with other polarizer plates [manufactured by SANRITZ Company; HLC2-5618]. The members of the liquid crystal display device were arranged in a manner such that the absorption axis of the polarizer plate of the output side and the in-plane slow axis of the liquid crystal cell under application of no voltage were parallel to each other, and the absorption axis of the polarizer plate of the incident side and the in-plane slow axis of the liquid crystal cell under application of no voltage were perpendicular to each other, and a liquid crystal display device, LCD-8, was prepared. The obtained device had a structure in which the members were disposed in the following order from the side of vision of the liquid crystal display device: the polarizer plate, the liquid crystal cell and the polarizer plate.

When the property of display of the obtained liquid crystal display device was evaluated by visual observation, it was found that images of display were poor due to insufficient contrast when they were observed in an oblique angle of 45° although the images of display were excellent when they were observed directly in front of the display. Reflection of light from the outside was found. The reflectance at the wavelength of 550 nm was 3.51%, and the maximum value of the reflectance at wavelengths in the range of 430 to 700 nm was 3.55%. Scratches were clearly found in the test of scratch resistance.

INDUSTRIAL APPLICABILITY

The liquid crystal display device of the present invention exhibits excellent antireflection property and scratch resistance, prevents the decrease in contrast in observation of the display at oblique angles without decrease in the quality of the images in observation directly in front of the display, provides a wide angle of field and achieves uniform display of images with great contrast at any angle of observation. The liquid crystal display device of the present invention can be advantageously applied, in particular, to the liquid crystal display devices of the in-plane switching mode.

The invention claimed is:

1. A liquid crystal display device of an in-plane switching mode which comprises a pair of polarizers which are a polarizer at an output side and a polarizer at an incident side and disposed at relative positions such that absorption axes of the polarizers are approximately perpendicular to each other and at least optically anisotropic member (A), optically anisotropic member (B) and a liquid crystal cell which are disposed between the pair of polarizers, wherein $n_{zA} > n_{yA}$ and $n_{xB} > n_{zB}$ when, with respect to optically anisotropic member (A) and optically anisotropic member (B), refractive indices in a direction of an in-plane slow axis are represented by $n_{xA}$ and $n_{xB}$, respectively, refractive indices in a direction in-plane and perpendicular to the direction of an in-plane slow axis are represented by $n_{yA}$ and $n_{yB}$, respectively, and refractive indices in a direction of a thickness are represented by $n_{zA}$ and $n_{zB}$, respectively, each measured using light having a wavelength of 550 nm, wherein the liquid crystal display device is in the following configuration, wherein optically anisotropic member (A) and optically anisotropic member (B) are disposed between the polarizer at the output side and the liquid crystal cell, the absorption axis of the polarizer at the incident side and the in-plane slow axis of the liquid crystal of the liquid crystal cell under application of no voltage are disposed at relative positions parallel to each other, the in-plane slow axis of optically anisotropic member (A) and the in-plane slow axis of optically anisotropic member (B) are disposed at relative positions approximately parallel to each other, and the in-plane slow axis of optically anisotropic member (B) and the in-plane slow axis of the liquid crystal of the liquid crystal cell under application of no voltage are disposed at relative positions approximately parallel to each other, and wherein an in-plane retardation $R_e(A)$, a retardation in the direction of the thickness $R_{th}(A)$ of optically anisotropic member (A), and an in-plane retardation $R_e(B)$, a retardation in the direction of the thickness $R_{th}(B)$ of optically anisotropic member (B) satisfy the following formulae:

$70 \leq R_e(A) \leq 120$, $-65 \leq R_{th}(A) \leq -25$, $50 \leq R_e(B) \leq 110$ and $25 \leq R_{th}(B) \leq 70$, wherein $R_e(A) = (n_{xA} - n_{yA}) \times d_A$, $R_e(B) = (n_{xB} - n_{yB}) \times d_B$,
$R_{th}(A) = [(n_{xA} + n_{yA})/2 - n_{zA}] \times d_A$, $R_{th}(B) = [(n_{xB} + n_{yB})/2 - n_{zB}] \times d_B$, $d_A$ and $d_B$ representing thicknesses of optically anisotropic member (A) and (B), respectively, and the units of retardations in the formulae described above are expressed by nm.

2. A liquid crystal display device of an in-plane switching mode which comprises a pair of polarizers which are a polarizer at an output side and a polarizer at an incident side and disposed at relative positions such that absorption axes of the polarizers are approximately perpendicular to each other and at least optically anisotropic member (A), optically anisotropic member (B) and a liquid crystal cell which are disposed between the pair of polarizers, wherein $n_{zA} > n_{yA}$ and $n_{xB} > n_{zB}$ when, with respect to optically anisotropic member (A) and optically anisotropic member (B), refractive indices in a direction of an in-plane slow axis are represented by $n_{xA}$ and $n_{xB}$, respectively, refractive indices in a direction inplane and perpendicular to the direction of an in-plane slow axis are represented by $n_{yA}$ and $n_{yB}$, respectively, and refractive indices in a direction of a thickness are represented by $n_{zA}$ and $n_{zB}$, respectively, each measured using light having a wavelength of 550 nm, wherein the liquid crystal display device is in the following configuration, wherein optically anisotropic member (A) and optically anisotropic member (B) are disposed between the polarizer at the output side and the liquid crystal cell, the absorption axis of the polarizer at the output side and the in-plane slow axis of a liquid crystal of the liquid crystal cell under application of no voltage are disposed at relative positions perpendicular to each other, and the in-plane slow axis of optically anisotropic member (A) and the in-plane slow axis of optically anisotropic member (B) are disposed at relative positions approximately parallel to each other, the in-plane slow axis of optically anisotropic member (B) and the in-plane slow axis of the liquid crystal of the liquid crystal cell under application of no voltage are disposed at relative positions approximately perpendicular to each other, and wherein an in-plane retardation Re(A), a retardation in the direction of the thickness $R_{th}(A)$ of optically anisotropic member (A), and an in-plane retardation $R_e(B)$, a retardation in the direction of the thickness $R_{th}(B)$ of optically anisotropic member (B) satisfy the following formulae:

$$30 \leq R_e(A) \leq 150,$$

$$-90 \leq R_{th}(A) \leq -15,$$

$$40 \leq R_e(B) \leq 150 \text{ and}$$

$$20 \leq R_{th}(B) \leq 75,$$

wherein $R_e(A) = (n_{xA} - n_{yA}) \times d_A$, $R_e(B) = (n_{xB} - n_{yB}) \times d_B$, $R_{th}(A) = [(n_{xA} + n_{yA})/2 - n_{zA}] \times d_A$, $R_{th}(B) = [(n_{xB} + n_{yB})/2 - n_{zB}] \times d_B$, $d_A$ and $d_B$ representing thicknesses of optically anisotropic member (A) and (B), respectively, and the units of retardations in the formulae described above are expressed by nm.

3. The liquid crystal display device according to claim 1, wherein an absolute value of a difference between $n_{xA}$ and $n_{zA}$ is 0.003 or smaller, and an absolute value of a difference between $n_{yB}$ and $n_{zB}$ is 0.003 or smaller.

4. The liquid crystal display device according to claim 1, wherein optically anisotropic member (A) comprises a layer selected from following layers (i) to (iii):
   (i) A layer comprising a material having a negative value of intrinsic birefringence,
   (ii) A layer comprising discotic liquid crystal molecules or lyotropic liquid crystal molecules,
   (iii) A layer comprising a photo-isomerizable substance.

5. The liquid crystal display device according claim 1, wherein optically anisotropic member (A) is disposed at a position closer to the liquid crystal cell than optically anisotropic member (B).

6. The liquid crystal display device according to claim 2, wherein optically anisotropic member (B) is disposed at a position closer to the liquid crystal cell than optically anisotropic member (A).

* * * * *